(12) United States Patent
Sugihara et al.

(10) Patent No.: US 11,555,441 B2
(45) Date of Patent: Jan. 17, 2023

(54) COOLING SYSTEM FOR HYBRID VEHICLE

(71) Applicant: TOYOTA JIDOSHA KABUSHIKI KAISHA, Toyota (JP)

(72) Inventors: Hiroyuki Sugihara, Sunto-gun (JP); Takuya Hirai, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 861 days.

(21) Appl. No.: 16/505,832

(22) Filed: Jul. 9, 2019

(65) Prior Publication Data

US 2020/0088090 A1 Mar. 19, 2020

(30) Foreign Application Priority Data

Sep. 13, 2018 (JP) .............................. JP2018-171291

(51) Int. Cl.
  *B60H 1/00* (2006.01)
  *F02B 29/04* (2006.01)
  *B60H 1/32* (2006.01)

(52) U.S. Cl.
  CPC ......... *F02B 29/0443* (2013.01); *B60H 1/004* (2013.01); *B60H 1/00278* (2013.01); *B60H 1/00885* (2013.01); *B60H 1/3205* (2013.01); *B60H 1/32284* (2019.05); *B60H 2001/00307* (2013.01); *B60H 2001/00928* (2013.01); *B60H 2001/3266* (2013.01); *B60H 2001/3276* (2013.01)

(58) Field of Classification Search
  CPC ........ B60H 1/00; B60H 1/32; B60H 1/32284; B60H 1/004; B60H 1/3205; B60H 1/00885; B60H 1/00278; B60H 1/00899; B60H 1/00914; B60H 1/00964; B60H 2001/3266; B60H 2001/3276; B60H 2001/00307; B60H 2011/00928; F02B 29/04; F02B 29/0443; F01P 3/22; F01P 7/165; F01P 2050/24; Y02T 10/12
  See application file for complete search history.

(56) References Cited

U.S. PATENT DOCUMENTS

2016/0121694 A1    5/2016  Kim
2016/0339761 A1 * 11/2016  Enomoto ........... B60H 1/00899

FOREIGN PATENT DOCUMENTS

| CN | 106183788 A | 12/2016 | |
| FR | 3051155 A1 * | 11/2017 | .............. B60L 53/14 |
| JP | 2014-173747 A | 9/2014 | |
| JP | 2015055163 A * | 3/2015 | |
| JP | 2017-072092 A | 4/2017 | |

* cited by examiner

*Primary Examiner* — Harry E Arant
(74) *Attorney, Agent, or Firm* — Oliff PLC

(57) ABSTRACT

A cooling system for a hybrid vehicle that cools cooling medium for an air conditioner without reducing a driving performance, irrespective of a running condition. A detector detects data relating to operating conditions of a high-current device cooling circuit, a supercharger cooling circuit, a high-current device, an engine, a supercharger, and the hybrid vehicle. A controller selects one of a first water passage and a second water passage by manipulating a control valve based on the data collected by the detector, in such a manner as to maximize an amount of heat transferred from the cooling medium to high-current device cooling water or supercharger cooling water.

3 Claims, 11 Drawing Sheets

COOLING SYSTEM FOR HYBRID VEHICLE

CROSS REFERENCE TO RELATED APPLICATIONS

The present application claims the benefit of priority to Japanese Patent Application No. 2018-171291 filed on Sep. 13, 2018 with the Japanese Patent Office, the entire contents of which are incorporated herein by reference in its entirety.

BACKGROUND

Field of the Disclosure

Embodiments of the disclosure relate to the art of a cooling system for a hybrid vehicle having an engine provided with a supercharger and a motor, and more specifically, to a cooling system comprising a cooling water cooling circuit, a supercharger cooling circuit, and a high-current device cooling circuit.

Discussion of the Related Art

JP-A-2017-72092 describes a vehicle cooling device for improving fuel efficiency by efficiently cooling an engine, an intercooler and a condenser which cools an air-conditioning coolant. The vehicle cooling device taught by JP-A-2017-72092 comprises, a main radiator for cooling the engine having a supercharger and an engine coolant, a water-cooled intercooler for cooling an intake air compressed by the supercharger, a water-cooled condenser for cooling a coolant for an air conditioner, and a sub-radiator for cooling a coolant for the water-cooled intercooler and a coolant for the water-cooled condenser. According to the teachings of JP-A-2017-72092, the water-cooled intercooler and the water-cooled condenser are arranged in parallel to each other at a downstream side of the sub-radiator in a flowing direction of cooling water. An outlet of the coolant to be supplied to the water-cooled intercooler is arranged at the upstream of an outlet of the coolant to be supplied to the water-cooled condenser.

JP-A-2014-173747 describes a complex type heat exchanger applied to a hybrid vehicle. The complex type heat exchanger taught by JP-A-2014-173747 comprises: a main radiator for cooling an engine coolant; a sub-radiator for cooling a coolant for a high electrical current appliance such as a motor and an inverter; an air-cooled condenser for cooling an air-conditioning coolant; and a water-cooled condenser for exchanging heat between the coolant for the high electrical current appliance and the air-conditioning coolant. According to the teachings of JP-A-2014-173747, the sub-radiator comprises a first heat exchange section and a second heat exchange section, and the air-conditioning coolant is cooled by the coolant for the high electrical current appliance cooled by the first exchange section in the water-cooled condenser. The coolant for the high electrical current appliance whose temperature has been raised as a result of heat exchange with the air-conditioning coolant is cooled in the second heat exchange section of the sub-radiator, and used to cool the high electrical current appliance.

In the vehicle cooling device taught by JP-A-2017-72092, a coolant cooling circuit and a supercharger cooling circuit are connected to each other through the water-cooled condenser and the sub-radiator. Heat of the coolant cooling circuit is radiated thereby cooling the air-conditioning coolant as a result of heat exchange between the coolant cooling circuit and the supercharger cooling circuit through the water-cooled condenser. According to the teachings of JP-A-2017-72092, therefore, the coolant colder than the coolant supplied to the water-cooled intercooler can be supplied to the water-cooled condenser. For this reason, the engine, the water-cooled intercooler, and the water-cooled condenser can be cooled efficiently.

However, the air-conditioning coolant may not be cooled sufficiently by the vehicle cooling device taught by JP-A-2017-72092 depending on a temperature of the air-conditioning coolant and a running condition of the vehicle. For example, in a case that an external temperature is high and a load on the engine is high (e.g., a supercharging pressure is high), the temperature of the supercharger cooling circuit is raised. In this case, heat may not be exchanged sufficiently between the coolant cooling circuit and the supercharger cooling circuit, and hence the air-conditioning coolant may not be cooled sufficiently. Consequently, cooling performance of the air conditioner may be reduced. Further, the supercharging pressure has to be restricted to suppress temperature rise of the coolant flowing through the supercharger cooling circuit. Consequently, an output power of the engine is restricted thereby reducing driving performance of the vehicle.

In the complex type heat exchanger taught by JP-A-2014-173747, a coolant cooling circuit and a high electrical current appliance cooling circuit are connected to each other through the air-cooled condenser and the sub-radiator. As described, the air-conditioning coolant is cooled by the coolant for the high electrical current appliance cooled by the first exchange section in the water-cooled condenser. According to the teachings of JP-A-2014-173747, therefore, the air-conditioning coolant can be cooled before flowing into the air-cooled condenser so that the high electrical current appliance is cooled effectively.

However, the air-conditioning coolant may also not be cooled sufficiently by the complex type heat exchanger taught by JP-A-2014-173747 depending on a temperature of the air-conditioning coolant and a running condition of the vehicle. For example, in a case that an external temperature is high and a load on the motor is high, the temperature of the coolant flowing through the high electrical current appliance cooling circuit is raised. In this case, heat may not be exchanged sufficiently between the coolant cooling circuit and the high electrical current appliance cooling circuit, and hence the air-conditioning coolant may not be cooled sufficiently. Consequently, cooling performance of the air conditioner may be reduced. Further, an output power of the motor has to be restricted to suppress temperature rise of the coolant flowing through the high electrical current appliance cooling circuit. Consequently, driving performance of the vehicle may be reduced.

SUMMARY

Aspects of embodiments of the present disclosure have been conceived noting the foregoing technical problems, and it is therefore an object of the present disclosure to provide a cooling system for a hybrid vehicle that cools coolant for an air conditioner to improve a cooling performance of the air conditioner without reducing a driving performance, and irrespective of a running condition.

According to the exemplary embodiment of the present disclosure, there is provided a cooling system for a hybrid vehicle, comprising: a prime mover including an engine having a supercharger, and a motor; an air conditioner that cools a vehicle interior; a refrigerant cooling circuit that cools a cooling medium used in the air conditioner; a high-current device cooling circuit that cools a high-current device cooling water delivered to a high-current device that controls the motor; a water-cooled intercooler that cools an air compressed by the supercharger; and a supercharger cooling circuit that cools a supercharger cooling water delivered to the water-cooled intercooler. In order to achieve the above-explained objective, the refrigerant cooling circuit is provided with a water-cooled condenser that exchange heat between the cooling medium and the high-current device cooling water or the supercharger cooling water thereby cooling the cooling medium. The cooling system comprises: a first water passage that connects the refrigerant cooling circuit to the high-current device cooling circuit to deliver the high-current device cooling water to the water-cooled condenser; a second water passage that connects the refrigerant cooling circuit to the supercharger cooling circuit to deliver the supercharger cooling water to the water-cooled condenser; a control valve that selectively communicates the high-current device cooling circuit with the refrigerant cooling circuit through the first water passage, and selectively communicates the supercharger cooling circuit with the refrigerant cooling circuit through the second water passage; a detector that detects data relating to an operating condition of at least any one of the high-current device cooling circuit, the supercharger cooling circuit, the high-current device, the engine, the supercharger, and the hybrid vehicle; and a controller that is configured to select one of the first water passage and the second water passage by manipulating the control valve based on the data collected by the detector, in such a manner as to maximize an amount of heat transferred from the cooling medium to the high-current device cooling water or the supercharger cooling water.

In a non-limiting embodiment, the controller may be further configured to; obtain a first amount of the heat to be transferred from the cooling medium to the high-current device cooling water in the water-cooled condenser based on the data collected by the detector; obtain a second amount of the heat to be transferred from the cooling medium to the supercharger cooling water in the water-cooled condenser based on the data collected by the detector; select the first water passage to deliver the high-current device cooling water to the water-cooled condenser if the first amount of the heat is greater than the second amount of the heat; and select the second water passage to deliver the supercharger cooling water to the water-cooled condenser if the second amount of the heat is greater than the first amount of the heat.

In a non-limiting embodiment, the detector may include a water temperature sensor that detects a temperature of the high-current device cooling water, and a water temperature sensor that detects a temperature of the supercharger cooling water. The controller may be further configured to: select the first water passage to deliver the high-current device cooling water to the water-cooled condenser if the temperature of the high-current device cooling water is lower than the temperature of the supercharger cooling water; and select the second water passage to deliver the supercharger cooling water to the water-cooled condenser if the temperature of the supercharger cooling water is lower than the temperature of the high-current device cooling water.

In a non-limiting embodiment, the detector may include a motor speed sensor that detects a rotational speed of the motor, and a turbine speed sensor that detects a rotational speed of a turbine of the supercharger. The controller may be further configured to: select the first water passage to deliver the high-current device cooling water to the water-cooled condenser if the rotational speed of the turbine is higher than a first reference speed and the rotational speed of the motor is equal to or lower than a second reference speed; and select the second water passage to deliver the supercharger cooling water to the water-cooled condenser if the rotational speed of the turbine is equal to or lower than the first reference speed and the rotational speed of the motor is higher than a third reference speed.

In a non-limiting embodiment, the detector may include a vehicle speed sensor that detects a speed of the hybrid vehicle. The controller may be further configured to: determine a fact that the hybrid vehicle stops based on the speed of the hybrid vehicle detected by the vehicle speed sensor; and select the second water passage to deliver the supercharger cooling water to the water-cooled condenser if the hybrid vehicle stops.

In a non-limiting embodiment, the high-current device may include an electric storage device that supplies electricity to the motor and that is charged with electricity generated by the motor, and the detector may include a state of charge level sensor that detects a state of charge level of the electric storage device. The controller may be further configured to select the first water passage to deliver the high-current device cooling water to the water-cooled condenser if the state of charge level of the electric storage device is lower than a reference level.

In a non-limiting embodiment, the supercharger cooling circuit may include a water pump that circulates the supercharger cooling water in the supercharger cooling circuit, and the detector may include a pump sensor that detects an operating condition of the water pump. The controller may be further configured to select the first water passage to deliver the high-current device cooling water to the water-cooled condenser if the water pump stops.

Thus, in the cooling system according to the exemplary embodiment of the present disclosure, the control valve is manipulated to select one of the first water passage and the second water passage in such a manner as to maximize an amount of heat transferred from the cooling medium to the high-current device cooling water or the supercharger cooling water in the condenser. To this end, the controller compares cooling effects of the high-current device cooling water and supercharger cooling water, and selects the water passage from the first water passage and the second water passage in such a manner as to deliver the cooling water which can cool the cooling medium more effectively to the condenser. According to the exemplary embodiment of the present disclosure, therefore, the water passage can be selected to cool the cooling medium more effectively depending on the operating conditions of the hybrid vehicle and the cooling circuits. For this reason, cooling performance of an air conditioner can be enhanced.

In order to select the water passage, for example, the controller estimates the first amount of the heat to be transferred from the cooling medium to the high-current device cooling water in the condenser and the second amount of the heat to be transferred from the cooling medium to the supercharger cooling water in the condenser, based on the data collected by the detector. In this case, the water passage is selected from the first water passage and the second water passage in such a manner as to deliver the cooling water to which a larger amount of the heat can be transferred from the cooling medium. According to the exemplary embodiment of the present disclosure, therefore, the water passage can be selected to cool the cooling medium more effectively depending on the operating conditions of the hybrid vehicle and the cooling circuits. For this reason, cooling performance of an air conditioner can be enhanced.

The water passage may also be selected from the first water passage and the second water passage based on the temperatures of the high-current device cooling water and the supercharger cooling water detected by the water temperature sensors. For example, the first water passage is selected to deliver the high-current device cooling water to the condenser when the temperature of the high-current device cooling water is lower than the temperature of the supercharger cooling water. By contrast, the second water passage is selected to deliver the supercharger cooling water to the water-cooled condenser when the temperature of the supercharger cooling water is lower than the temperature of the high-current device cooling water. Specifically, when the engine is highly loaded and a supercharging pressure is high, the temperature of the supercharger cooling water is raised higher than the temperature of the high-current device cooling water. In this case, the first water passage is selected so that the high-current device cooling water whose temperature is lower than the temperature of the supercharger cooling water is delivered to the condenser. Consequently, the cooling medium is cooled by the high-current device cooling water in the condenser. By contrast, when the motor is highly loaded, the temperature of the high-current device cooling water is raised higher than the temperature of the supercharger cooling water. In this case, the second water passage is selected so that the supercharger cooling water whose temperature is lower than the temperature of the high-current device cooling water is delivered to the condenser. Consequently, the cooling medium is cooled by the supercharger cooling water in the condenser. Thus, even if the engine is highly loaded and a supercharging pressure is high, the cooling medium can be cooled effectively by the high-current device cooling water without restricting the supercharging pressure. Otherwise, even if the motor is highly loaded, the cooling medium can be cooled effectively by the supercharger cooling water without restricting the output power of the motor. In other words, the cooling medium can be cooled efficiently irrespective of the running condition of the vehicle, and without reducing the driving performance of the hybrid vehicle.

The water passage may also be selected from the first water passage and the second water passage based on the speeds of the motor and the turbine of the supercharger detected respectively by the motor speed sensor and the turbine speed sensor. For example, in the case that the turbine speed is higher than the first reference speed and that the motor speed is lower than the second reference speed, the vehicle is propelled mainly by an output power of the engine which is boosted by the supercharger. Accordingly, the temperature of the high-current device cooling water is estimated to be lower than the temperature of the supercharger cooling water. In this case, therefore, the first water passage is selected so that the high-current device cooling water whose temperature is lower than the temperature of the supercharger cooling water is delivered to the condenser. Consequently, the cooling medium is cooled by the high-current device cooling water in the condenser. Otherwise, in the case that the turbine speed is lower than the first reference speed and that the motor speed is higher than the third reference speed, the vehicle Ve is powered mainly by the motor. Accordingly, the temperature of the supercharger cooling water is estimated to be lower than the high-current device cooling water. In this case, therefore, the second water passage is selected so that the supercharger cooling water whose temperature is lower than the temperature of the high-current device cooling water is delivered to the condenser. Consequently, the cooling medium is cooled by the supercharger cooling water in the condenser. Thus, even if e.g., the engine is highly loaded and a supercharging pressure is high, the cooling medium can be cooled effectively by the high-current device cooling water without restricting the supercharging pressure. By contrast, even if the motor is highly loaded, the cooling medium can be cooled effectively by the supercharger cooling water without restricting the output power of the motor. In other words, the cooling medium can be cooled efficiently irrespective of the running condition of the vehicle, and without reducing the driving performance of the hybrid vehicle.

The water passage may also be selected from the first water passage and the second water passage based on the speed of the hybrid vehicle detected respectively by the vehicle speed sensor. For example, if the speed the hybrid vehicle is lower than the reference speed set to an extremely low speed, the controller determines that the hybrid vehicle stops. In this case, the engine is not subjected to a load and the supercharger is not activated, therefore, the temperature of the supercharger cooling water is not expected to be raised. In addition, when the hybrid vehicle is decelerated before stopping, and when the hybrid vehicle is launched, the hybrid vehicle is powered mainly by the motor, therefore, the temperature of the high-current device cooling water is expected to be raised. In this case, therefore, the second water passage is selected so that the supercharger cooling water whose temperature is lower than the temperature of the high-current device cooling water is delivered to the condenser. Consequently, the cooling medium is cooled by the supercharger cooling water in the condenser. Thus, the cooling medium can be cooled efficiently even when the vehicle stops.

The water passage may also be selected from the first water passage and the second water passage based on the state of charge level of the electric storage device. For example, if the state of charge level of the electric storage device is lower than the reference level, the motor is operated as a generator to charge the electric storage device. In this case, the temperature of the motor is not be raised significantly, and the temperature of the high-current device cooling water will not be raised significantly. Accordingly, the temperature of the high-current device cooling water is estimated to be lower than the temperature of the supercharger cooling water. In this case, therefore, the first water passage is selected so that the high-current device cooling water whose temperature is lower than the temperature of the supercharger cooling water is delivered to the condenser. Consequently, the cooling medium is cooled by the high-current device cooling water in the condenser. Thus, the cooling medium can be cooled efficiently even when the state of charge level of the electric storage device is low.

The water passage may also be selected from the first water passage and the second water passage based on the operating condition of the water pump. For example, if the operating load of the engine is low and the supercharger is not activated, it is not necessary to cool the intake air. In this case, therefore, an operation of the water pump arranged in the supercharger cooling circuit may be stopped to reduce energy consumption. When the water pump is stopped, the first amount of the heat to be transferred from the cooling medium to the high-current device cooling water is estimated to be greater than the second amount of the heat to be transferred from the cooling medium to the supercharger cooling water. That is, in this situation, the supercharger cooling water is not delivered to the condenser from the supercharger cooling circuit, and hence the second amount of the heat is estimated as zero. In this case, therefore, the first water passage is selected so that the high-current device cooling water whose temperature is lower than the temperature of the supercharger cooling water is delivered to the condenser. Consequently, the cooling medium is cooled by the high-current device cooling water in the condenser. Thus, the cooling medium can be cooled efficiently even when the operation of the supercharger cooling circuit is stopped.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Preferred embodiments of the present disclosure will now be explained with reference to the accompanying drawings.

Figure 1:
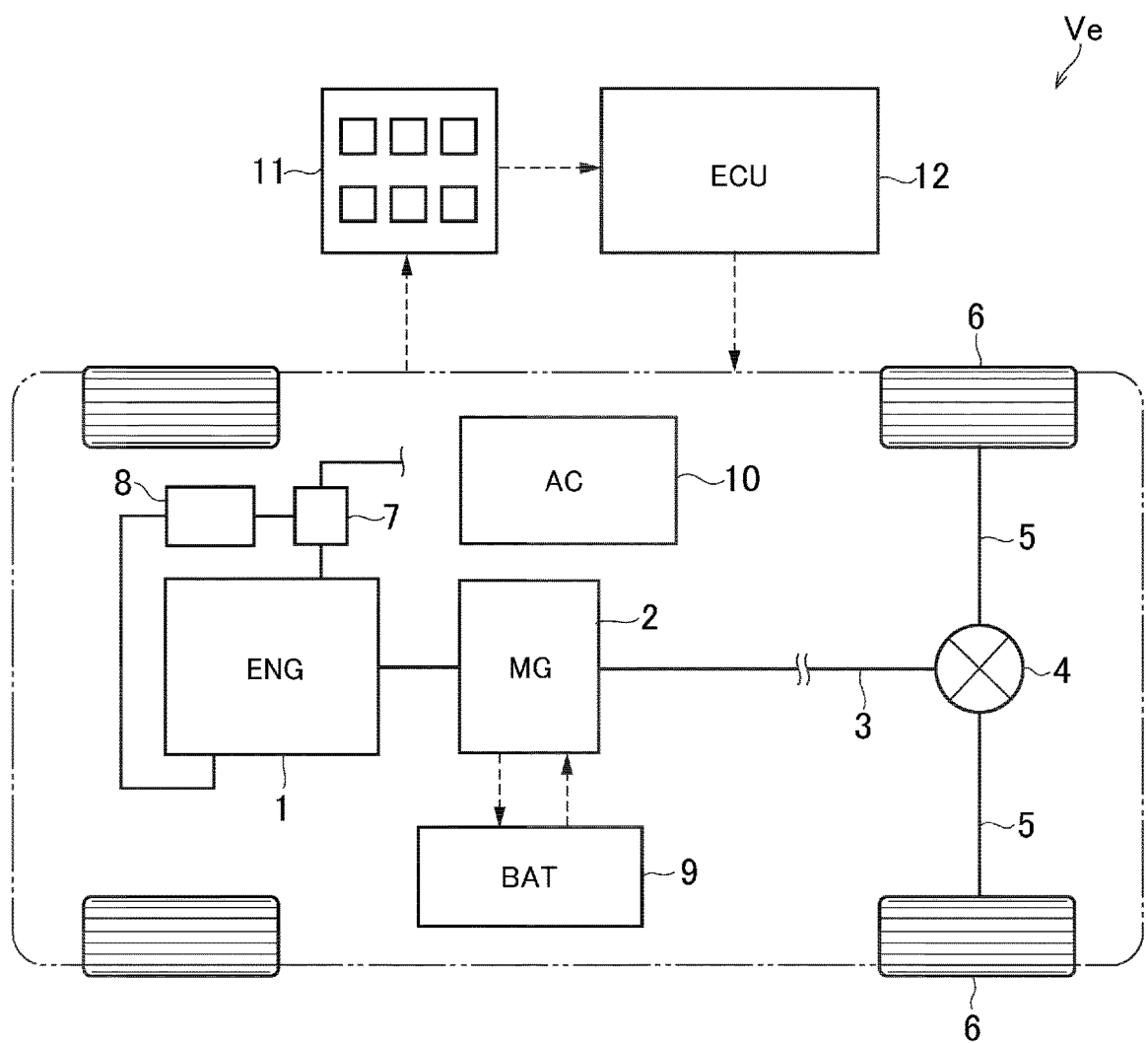
FIG. 1 is a schematic illustration showing a structure of the hybrid vehicle to which the cooling system according to the exemplary embodiment of the present disclosure is applied.

Turning now to FIG. 1, there is shown one example of a structure of the hybrid vehicle (as will be simply called the "vehicle" hereinafter) Ve to which the cooling system according to the embodiment of the present disclosure is applied. A prime mover of the vehicle Ve includes an engine (referred to as "ENG" in FIG. 1) 1 and a motor (referred to as "MG" in FIG. 1) 2 connected to an output side of the engine 1. The motor 2 is also connected to a pair of drive wheels 6 through a propeller shaft 3, a differential gear unit 4, and drive shafts 6.

For example, an internal combustion engine such as a gasoline engine and a diesel engine may be adopted as the engine 1. An output power of the engine 1 may be adjusted electrically, and the engine 1 may be started and stopped electrically according to need. The engine 1 is provided with a supercharger 7 and a water-cooled intercooler 8.

The supercharger 7 is a compressor that increases a pressure of intake air. According to the embodiment, the supercharger 7 includes a turbocharger. For example, the turbocharger in which a turbine (not shown) is driven by exhaust energy from the engine 1 may be adopted as the supercharger 7. The supercharger 7 is provided with a wastegate valve (not shown) that is actuated electrically, and a supercharging pressure generated by the supercharger 7 and timings to start and stop supercharging can be controlled by opening and closing the wastegate valve. Alternatively, a mechanically-driven supercharger in which a turbine is driven by an output torque of the engine 1 may also be adopted as the supercharger 7. In this case, an electromagnetic clutch (not shown) is arranged e.g., between an output shaft of the engine 1 and the supercharger 7, and a supercharging pressure generated by the supercharger 7 and timings to start and stop supercharging can be controlled by engaging and disengaging the electromagnetic clutch.

A temperature and a pressure of intake air to the engine 1 is increased as a result of being compressed by the supercharger 7. In order to cool the intake air to the engine 1, the intercooler 8 is disposed between an intake side of the engine 1 and the supercharger 7. That is, the intercooler 8 serves as a heat exchanger to compulsory radiate heat of the compressed intake air whose temperature has been raised. Specifically, the intercooler 8 cools the intake air by exchanging the heat of the intake air with another medium. For this purpose, according to the embodiment, a water-cooled intercooler that cools the intake air by cooling water is adopted as the intercooler 8. Specifically, the intercooler 8 cools the intake air by exchanging heat between the intake air and the cooling water. The vehicle Ve comprises a supercharger cooling circuit 103 including a radiator 18 that cools a supercharger cooling water 117 flowing through the intercooler 8, and a water pump 119 that circulates the supercharger cooling water 117. As a result of cooling the intake air to the engine 1, density of the intake air is increased so that an amount of air intake of the engine 1 is increased. Thus, a supercharging effect of the supercharger 7 and an output power of the engine 1 are enhanced by the supercharger 7.

The motor 2 may be a motor-generator that is operated not only as a generator when driven e.g., by an output torque of the engine 1, but also as a motor when driven by electricity supplied thereto. For example, a permanent magnet type synchronous motor, and an induction motor may be adopted as the motor 2. The motor 2 is connected to a battery (referred to as "BAT" in FIG. 1) 9 as an electric storage device through an inverter (not shown) so that the motor 2 is operated as a motor to generate torque by supplying the electricity accumulated in the battery 9 to the motor 2. When the motor 2 is driven as a generator by an output torque of the engine 1 or a torque delivered from the drive wheels 6, the electricity generated by the motor 2 may be accumulated in the battery 9.

The control system according to the exemplary embodiment may be applied not only to the parallel hybrid vehicle Ve shown in FIG. 1 in which the engine 1 and the motor 2 generate a drive torque respectively, but also to a series hybrid vehicle or a range extender electric vehicle in which the motor 2 serves only as a generator, and another motor is operated to generate a drive torque by the electricity generated by the motor 2 or supplied from the battery 9. Further, the control system according to the exemplary embodiment may also be applied to a series-parallel hybrid vehicle comprising a power split mechanism for synthesizing and distributing a motor torque and an engine torque, and to a hybrid vehicle in which a prime mover includes an engine and a plurality of motors. Thus, the control system according to the exemplary embodiment may be applied to any kind of hybrid vehicle in which a prime mover includes an engine provided with a supercharger and a motor.

The vehicle Ve further comprises an air conditioner (referred to as "AC" in FIG. 1) 10, a detector 11, and a controller (referred to as "ECU" in FIG. 1) 12.

The air conditioner 10 includes at least a cooling device (not shown) for cooling a vehicle interior (not shown). The cooling device comprises a refrigeration cycle, and a cooling medium circulating through the refrigeration cycle. The cooling medium is evaporated to withdraw heat of the air, and the air cooled by vaporization heat of the cooling medium is supplied to the vehicle interior. To this end, as explained later, a refrigerant cooling circuit 101 comprises a cooling medium 107, a compressor 108, a water-cooled condenser 109, an expansion valve 110, and an evaporator 111.

The detector 11 includes sensors and devices detecting and calculating data about operational conditions of an after-mentioned high-current device cooling circuit 102, a supercharger cooling circuit 103, a high-current device 112, the engine 1, the supercharger 7, and a running condition of the vehicle Ve. According to the exemplary embodiment, the detector 11 includes water temperature sensors 116 and 120, a motor speed sensor 301, a turbine speed sensor 302, a vehicle speed sensor 401, a state of charge (to be abbreviated as "SOC" hereinafter) level sensor 501, and a pump sensor 601. The detector 11 is electrically connected with the controller 12 so that detection values and calculation result are transmitted from the detector 11 to the controller 12 in the form of command signal.

The controller 12 as an electronic control unit including a microcomputer is configured to perform calculation using the incident data, and data and formulas and the like stored in advance. For example, calculation results are transmitted to the engine 1 and the motor 2 in the form of command signal to control the engine 1 and the motor 2. In addition, the controller 12 also controls a control valve 106 that controls a flow of the cooling water flowing through the refrigerant cooling circuit 101, the high-current device cooling circuit 102, and the supercharger cooling circuit 103. Specifically, the controller 12 controls the control valve 106 in such a manner as to maximize an amount of heat transmitted from the cooling medium 107 to the high-current device cooling water 113 or the supercharger cooling water 117.

Figure 2:
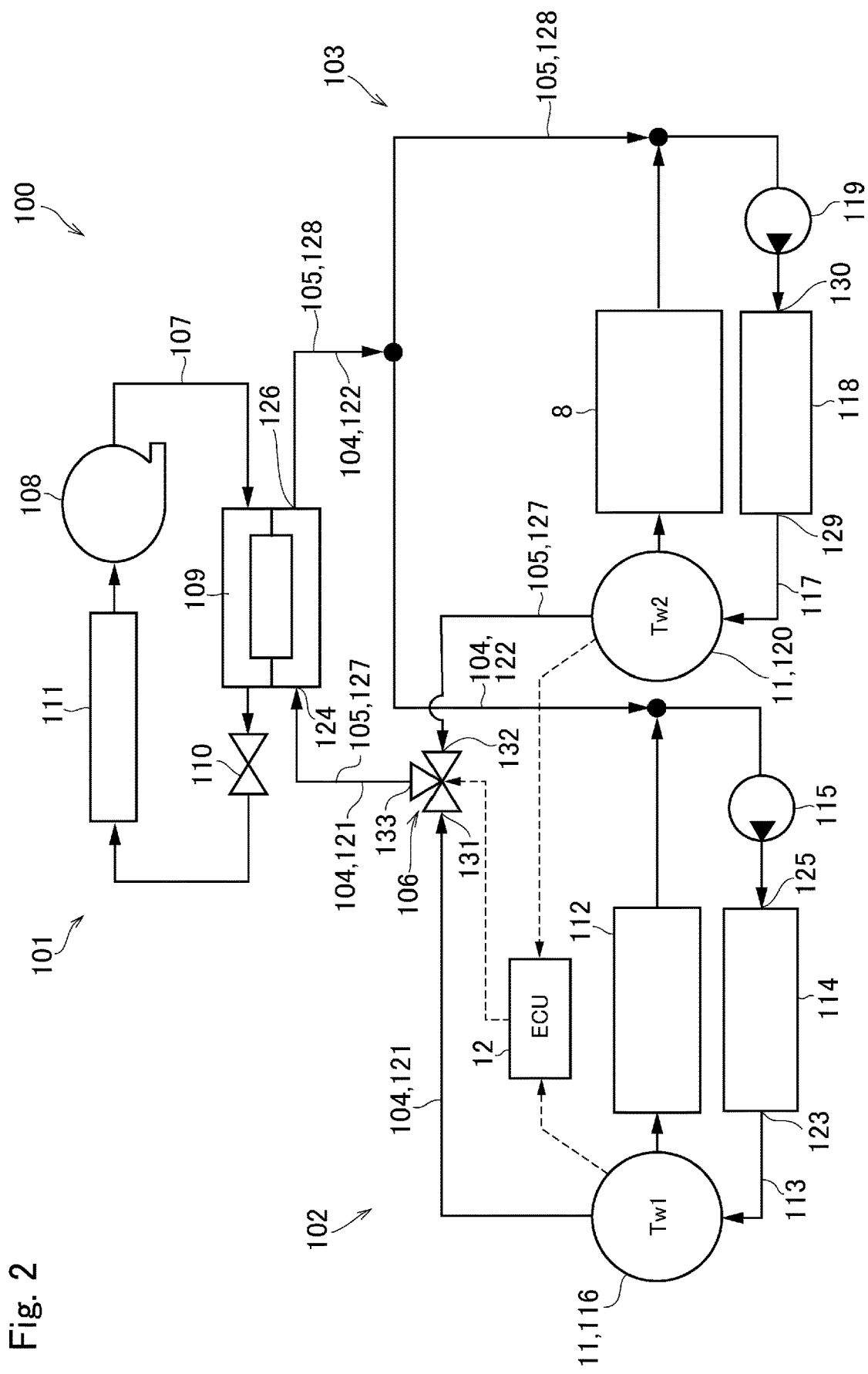
FIG. 2 is a schematic diagram showing a first example of the cooling system according to the exemplary embodiment of the present disclosure.

Turning to FIG. 2, there is shown the first example of a structure of the cooling system according to the present disclosure. The cooling system 100 shown in FIG. 2 comprises the refrigerant cooling circuit 101, the high-current device cooling circuit 102, the supercharger cooling circuit 103, a first water passage 104, a second water passage 105, the control valve 106, the detector 11, and the controller 12.

The refrigerant cooling circuit 101 serves as a refrigeration cycle of the air conditioner 10 that cools the cooling medium 107 used in the cooling device of the air conditioner 10. Specifically, the refrigerant cooling circuit 101 comprises the compressor 108, the condenser 109, the expansion valve 110, and the evaporator 111.

In the refrigerant cooling circuit 101, the cooling medium 107 in the gaseous phase is compressed by the compressor 108 so that the cooling medium 107 is heated and pressurized. As a result, the cooling medium 107 is brought into the semi-liquid phase, and delivered to the condenser 109.

The condenser 109 as a heat exchanger compulsory radiates heat of the cooling medium 107 in the semi-liquid phase (or dual-liquid phase) by exchanging the heat between the cooling medium 107 and another cooling medium. Specifically, the condenser 109 cools the cooling medium 107 by exchanging heat between the cooling medium 107 and the high-current device cooling water 113 or the supercharger cooling water 117. As a result of drawing heat from the cooling medium 107 in the semi-liquid phase, the cooling medium 107 is further condensed (or liquidized) to be brought into the liquid phase. Consequently, the cooling medium 107 is further is heated and pressurized, and delivered to the expansion valve 110.

In the cooling system 100, the cooling water used in the condenser 109 to cool the cooling medium 107 is selected from the high-current device cooling water 113 and the supercharger cooling water 117. Although not especially shown in FIG. 2, a receiver tank in which a desiccant and a strainer are arranged is disposed between the condenser 109 and the expansion valve 110. Therefore, contaminant contained in the cooling medium 107 is captured as a result of passing through the receiver tank on the way to the expansion valve 110.

The cooling medium 107 in the liquid phase thus heated and compressed is rapidly expanded (adiabatically) by the expansion valve 110. Specifically, the cooling medium 107 in the liquid phase is sprayed from a micro nozzle hole (not shown) of the expansion valve 110 toward the evaporator 111. As a result, heat and pressure of the cooling medium 107 are reduced so that the cooling medium 107 is turned into a mist. The cooling medium 107 thus delivered to the evaporator 111 is vaporized in the evaporator 111.

Specifically, the cooling medium 107 sprayed from the expansion valve 110 is brought into contact to an inner surface of the evaporator 111 so that the cooling medium 107 is heated to be evaporated. As a result, heat of the air existing in the vicinity of an outer surface of the evaporator 111 is drawn by the heat of evaporation of the cooling medium 107. The air thus cooled by the cooling medium 107 is delivered to the vehicle interior by a blower fan (not shown). The cooling medium 107 evaporated in the evaporator 111 is delivered again to the compressor 108 through the refrigerant cooling circuit 101.

The high-current device cooling water 113 to be supplied to the high-current device 112 for controlling the motor 2 is cooled in the high-current device cooling circuit 102 including a radiator 114, a water pump 115, and the water temperature sensor 116.

The high-current device 112 includes devices that generate heat during operation of the motor 2 such as a power control unit (not shown) of the motor 2, and a transaxle (not shown) combined with the motor 2. The high-current device 112 is cooled by the high-current device cooling water 113 supplied from the high-current device cooling circuit 102.

The radiator 114 as a heat exchanger compulsory radiates heat of the high-current device cooling water 113 whose temperature is raised as a result of cooling the high-current device 112. Specifically, the radiator 114 cools the high-current device cooling water 113 by exchanging heat between the high-current device cooling water 113 and the ambient air.

For example, an electric pressure pump may be adopted as the water pump 115, and the water pump 115 generates hydraulic pressure to circulate the high-current device cooling water 113 in the high-current device cooling circuit 102.

The detector 11 includes the water temperature sensor 116, and the water temperature sensor 116 is used to detect a temperature of the high-current device cooling water 113 circulating in the high-current device cooling circuit 102 for the purpose of collecting the data relating to the operational condition of the high-current device cooling circuit 102.

The supercharger cooling water 117 is cooled in the supercharger cooling circuit 103 including the intercooler 8, a radiator 118, the water pump 119, and the water temperature sensor 120.

The radiator 118 as a heat exchanger compulsory radiates heat of the supercharger cooling water 117 whose temperature is raised as a result of cooling the intake air to the engine 1 by the intercooler 8. Specifically, the radiator 118 cools the supercharger cooling water 117 by exchanging heat between the supercharger cooling water 117 and the ambient air.

The water pump 119 may also be an electric pressure pump, and the water pump 119 generates hydraulic pressure to circulate the supercharger cooling water 117 in the supercharger cooling circuit 103.

The detector 11 further includes the water temperature sensor 120, and the water temperature sensor 120 is used to detect a temperature of the supercharger cooling water 117 circulating in the supercharger cooling circuit 103 for the purpose of collecting the data relating to the operational condition of the supercharger cooling circuit 103.

The cooling system 100 is configured to enhance the cooling performance of the air conditioner 10 by cooling the cooling medium 107 of the air conditioner 10, irrespective of the running condition of the vehicle Ve, and without reducing the driving performance of the vehicle Ve. For this purpose, the cooling system 100 is further provided with the first water passage 104, the second water passage 105, and the control valve 106.

The first water passage 104 is a pipe or conduit for delivering the high-current device cooling water 113 to the condenser 109. In the cooling system 100, the first water passage 104 provides a connection between the high-current device cooling circuit 102 and the refrigerant cooling circuit 101 through the control valve 106. Specifically, the first water passage 104 includes a feeding passage 121 connecting an outlet 123 of the radiator 114 arranged in the high-current device cooling circuit 102 to an inlet 124 of the condenser 109 arranged in the refrigerant cooling circuit 101 through the control valve 106, and a returning passage 122 connecting an outlet 126 of the condenser 109 to an inlet 125 of the radiator 114 through the water pump 115.

The second water passage 105 is a pipe or conduit for delivering the supercharger cooling water 117 to the condenser 109. In the cooling system 100, the second water passage 105 provides a connection between the supercharger cooling circuit 103 and the refrigerant cooling circuit 101 through the control valve 106. Specifically, the second water passage 105 includes a feeding passage 127 connecting an outlet 129 of the radiator 118 arranged in the supercharger cooling circuit 103 to the inlet 124 of the condenser 109 through the control valve 106, and a returning passage 128 connecting an outlet 126 of the condenser 109 to an inlet 130 of the radiator 118 through the water pump 119.

The control valve 106 selectively provides a communication between the refrigerant cooling circuit 101 and the high-current device cooling circuit 102 through the first water passage 104, and between the refrigerant cooling circuit 101 and the supercharger cooling circuit 103 through the second water passage 105. To this end, in the cooling system 100, a 3-way valve having a first port 131, a second port 132, and a third port 133 is adopted as the control valve 106. In the control valve 106, the third port 133 is selectively communicated with the first port 131 and the second port 132 by the controller 12.

The first port 131 is connected to the outlet 123 of the radiator 114 in the high-current device cooling circuit 102 through the feeding passage 121 of the first water passage 104. The second port 132 is connected to the outlet 129 of the radiator 118 in the supercharger cooling circuit 103 through the feeding passage 127 of the second water passage 105. The third port 133 is connected to the inlet 124 of the condenser 109 in the refrigerant cooling circuit 101 through the feeding passage 121 of the first water passage 104 and the feeding passage 127 of the second water passage 105.

Figure 3:
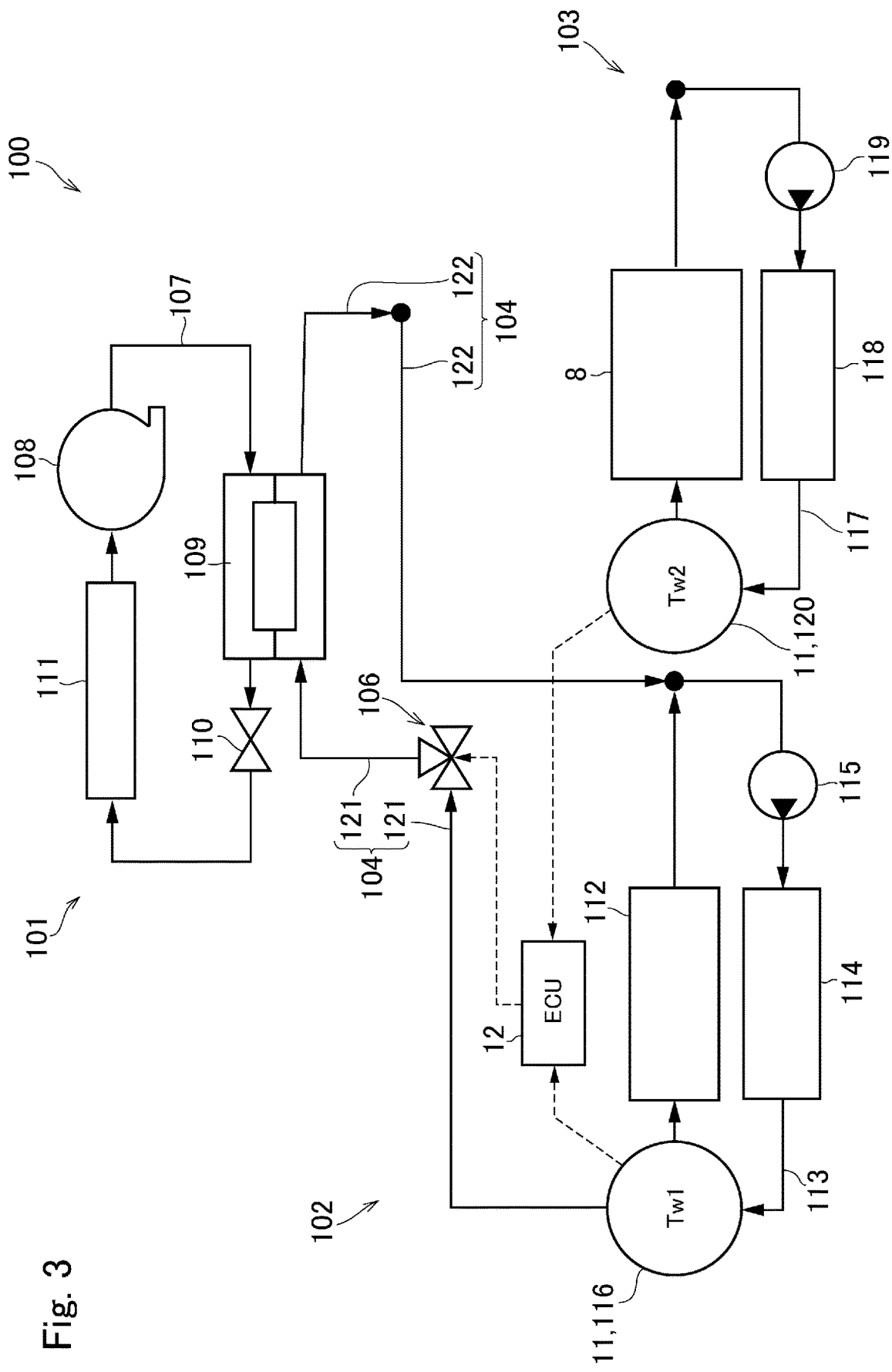
FIG. 3 is a schematic diagram showing a flowing direction of the cooling water in a case that the first water passage is selected.
Figure 4:
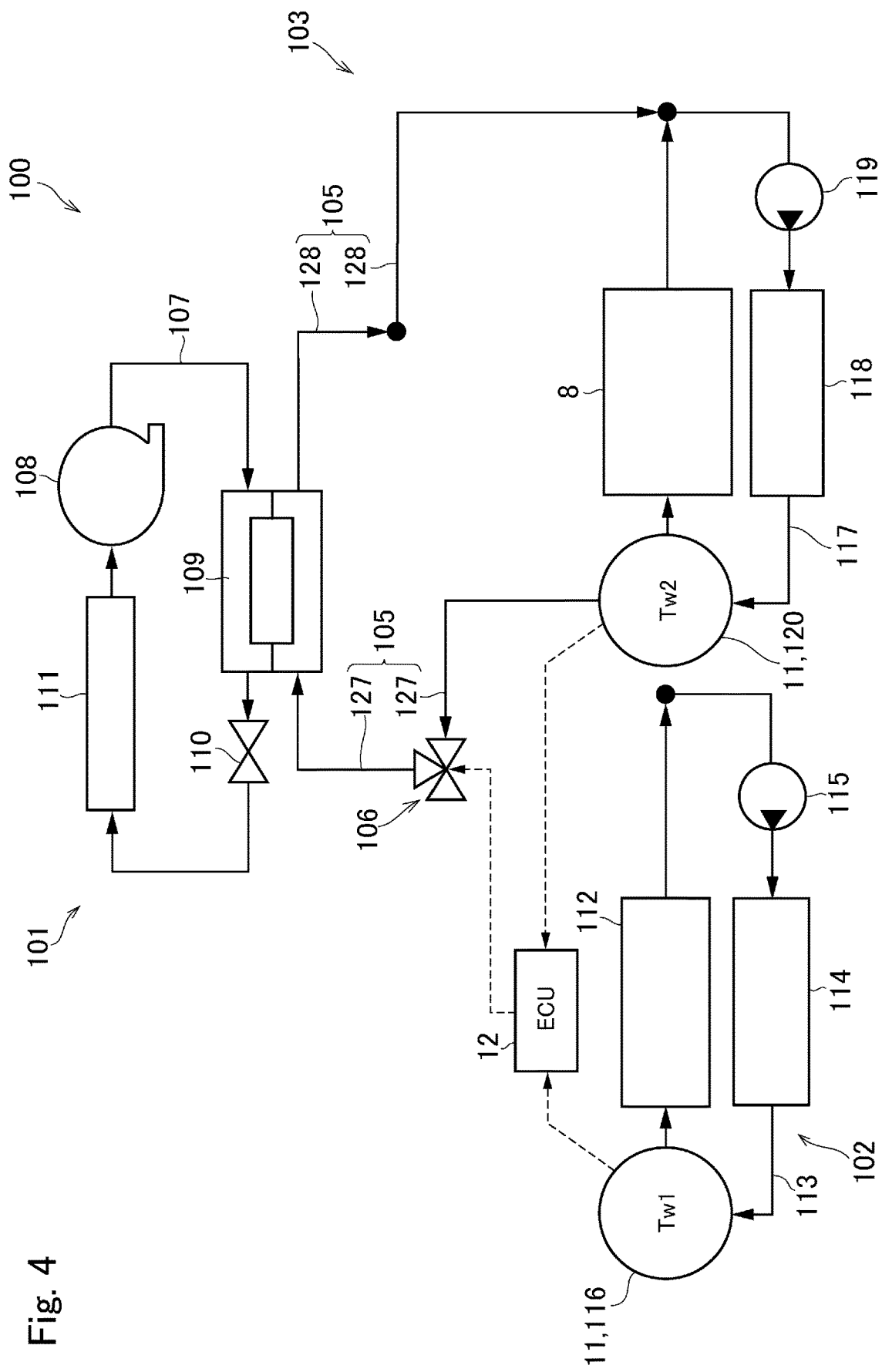
FIG. 4 is a schematic diagram showing a flowing direction of the cooling water in a case that the second water passage is selected.

In the cooling system 100, the high-current device cooling water 113 in the high-current device cooling circuit 102 and the supercharger cooling water 117 in the supercharger cooling circuit 103 may be supplied selectively to the condenser 109 arranged in the refrigerant cooling circuit 101 by manipulating the control valve 106. Specifically, as shown in FIG. 3, the high-current device cooling water 113 is delivered from the high-current device cooling circuit 102 to the condenser 109 in the refrigerant cooling circuit 101 via the first water passage 104. By contrast, as shown in FIG. 4, the supercharger cooling water 117 is delivered from the supercharger cooling circuit 103 to the condenser 109 in the refrigerant cooling circuit 101 via the second water passage 105.

In the cooling system 100, the control valve 106 is manipulated in such a manner as to maximize an amount of heat transferred from the cooling medium 107 to the high-current device cooling water 113 or the supercharger cooling water 117 in the condenser 109 arranged in the refrigerant cooling circuit 101, based on the data collected by the detector 11.

Figure 5:
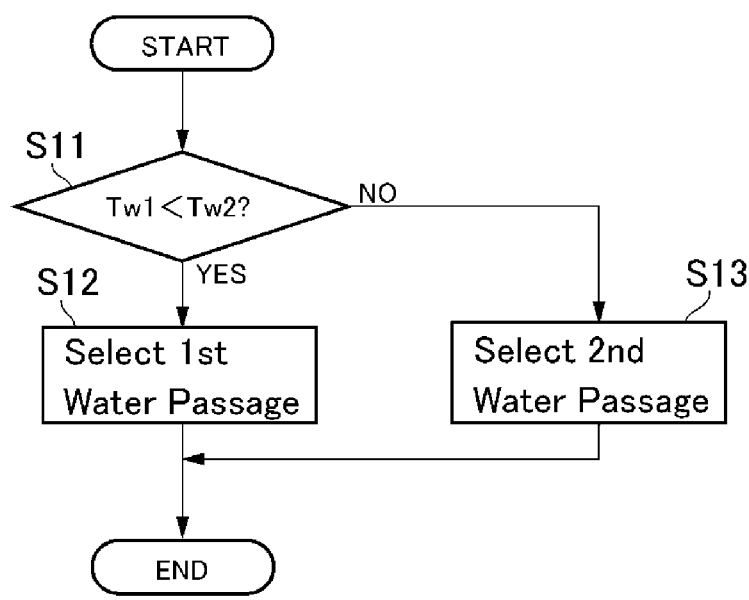
FIG. 5 is a flowchart showing an example of a routine to select the water passage based on the temperatures of the cooling waters circulating in the cooling circuits.

To this end, the cooling system 100 is configured to execute a routine shown in FIG. 5. At step S11, a temperature Tw1 of the high-current device cooling water 113 and a temperature Tw2 of the supercharger cooling water 117 are compared to each other. Specifically, at step S11, the controller 12 determines whether the temperature Tw1 of the high-current device cooling water 113 is lower than the temperature Tw2 of the supercharger cooling water 117. As described, the temperature Tw1 of the high-current device cooling water 113 may be detected by the water temperature sensor 116, and the temperature Tw2 of the supercharger cooling water 117 may be detected by the water temperature sensor 120.

If the temperature Tw1 of the high-current device cooling water 113 is lower than the temperature Tw2 of the supercharger cooling water 117 so that the answer of step S11 is YES, the routine progresses to step S12 to select the first water passage 104.

At step S12, specifically, the control valve 106 is manipulated in such a manner as to communicate the first port 131 with the third port 133. As a result, the high-current device cooling water 113 in the high-current device cooling circuit 102 is allowed to flow toward the condenser 109 of the refrigerant cooling circuit 101 through the first water passage 104.

In the case that the temperature Tw1 of the high-current device cooling water 113 is thus lower than the temperature Tw2 of the supercharger cooling water 117, this means that a first amount of the heat to be transferred from the cooling medium 107 to the high-current device cooling water 113 is greater than a second amount of the heat to be transferred from the cooling medium 107 to the supercharger cooling water 117. That is, at step S12, the high-current device cooling water 113 whose temperature Tw1 is lower than the temperature Tw2 of the supercharger cooling water 117 is delivered to the condenser 109 through the first water passage 104. Consequently, an amount of the heat possible to be drawn from the cooling medium 107 by the heat exchange in the condenser 109 can be maximized. For this reason, the cooling medium 107 can be cooled effectively in the refrigerant cooling circuit 101.

By contrast, if the temperature Tw1 of the high-current device cooling water 113 is higher than the temperature Tw2 of the supercharger cooling water 117 so that the answer of step S11 is NO, the routine progresses to step S13 to select the second water passage 105.

At step S13, specifically, the control valve 106 is manipulated in such a manner as to communicate the second port 132 with the third port 133. As a result, the supercharger cooling water 117 in the supercharger cooling circuit 103 is allowed to flow toward the condenser 109 of the refrigerant cooling circuit 101 through the second water passage 105.

In the case that the temperature Tw2 of the supercharger cooling water 117 is thus lower than the temperature Tw1 of the high-current device cooling water 113, this means that the second amount of the heat transferred from the cooling medium 107 to the supercharger cooling water 117 is greater than the first amount of the heat transferred from the cooling medium 107 to the high-current device cooling water 113. That is, at step S13, the supercharger cooling water 117 whose temperature Tw2 is lower than the temperature Tw1 of the high-current device cooling water 113 is delivered to the condenser 109 through the second water passage 105. Consequently, an amount of the heat possible to be drawn from the cooling medium 107 by the heat exchange in the condenser 109 may also be maximized. For this reason, the cooling medium 107 can be cooled effectively in the refrigerant cooling circuit 101.

After selecting the water passage from the first water passage 104 and the second water passage 105 at step S12 or S13, the routine returns.

Thus, in the cooling system 100, the cooling medium 107 can be cooled in the refrigerant cooling circuit 101 in the most efficient manner. For example, when the engine 1 is highly loaded and a supercharging pressure is high, the temperature Tw2 of the supercharger cooling water 117 may be raised higher than the temperature Tw1 of the high-current device cooling water 113. In this case, the first water passage 104 is selected so that the high-current device cooling water 113 whose temperature Tw1 is lower than the temperature Tw2 of the supercharger cooling water 117 is delivered to the condenser 109. Consequently, the cooling medium 107 is cooled by the high-current device cooling water 113 in the condenser 109. By contrast, when the motor 2 is highly loaded, the temperature Tw1 of the high-current device cooling water 113 may be raised higher than the temperature Tw2 of the supercharger cooling water 117. In this case, the second water passage 105 is selected so that the supercharger cooling water 117 whose temperature Tw2 is lower than the temperature Tw1 of the high-current device cooling water 113 is delivered to the condenser 109. Consequently, the cooling medium 107 is cooled by the supercharger cooling water 117 in the condenser 109.

Thus, even if e.g., the engine 1 is highly loaded and a supercharging pressure is high, the cooling medium 107 can be cooled effectively by the high-current device cooling water 113 without restricting the supercharging pressure. Otherwise, even if e.g., the motor 2 is highly loaded, the cooling medium 107 can be cooled effectively by the supercharger cooling water 117 without restricting the output power of the motor 2. In other words, the cooling medium 107 can be cooled efficiently irrespective of the running condition of the vehicle Ve, and without reducing the driving performance of the vehicle Ve.

Here will be explained another examples of the cooling system according to the embodiment of the present disclosure. In the following examples, common reference numerals are allotted to the elements in common with those of the foregoing example.

Figure 6:
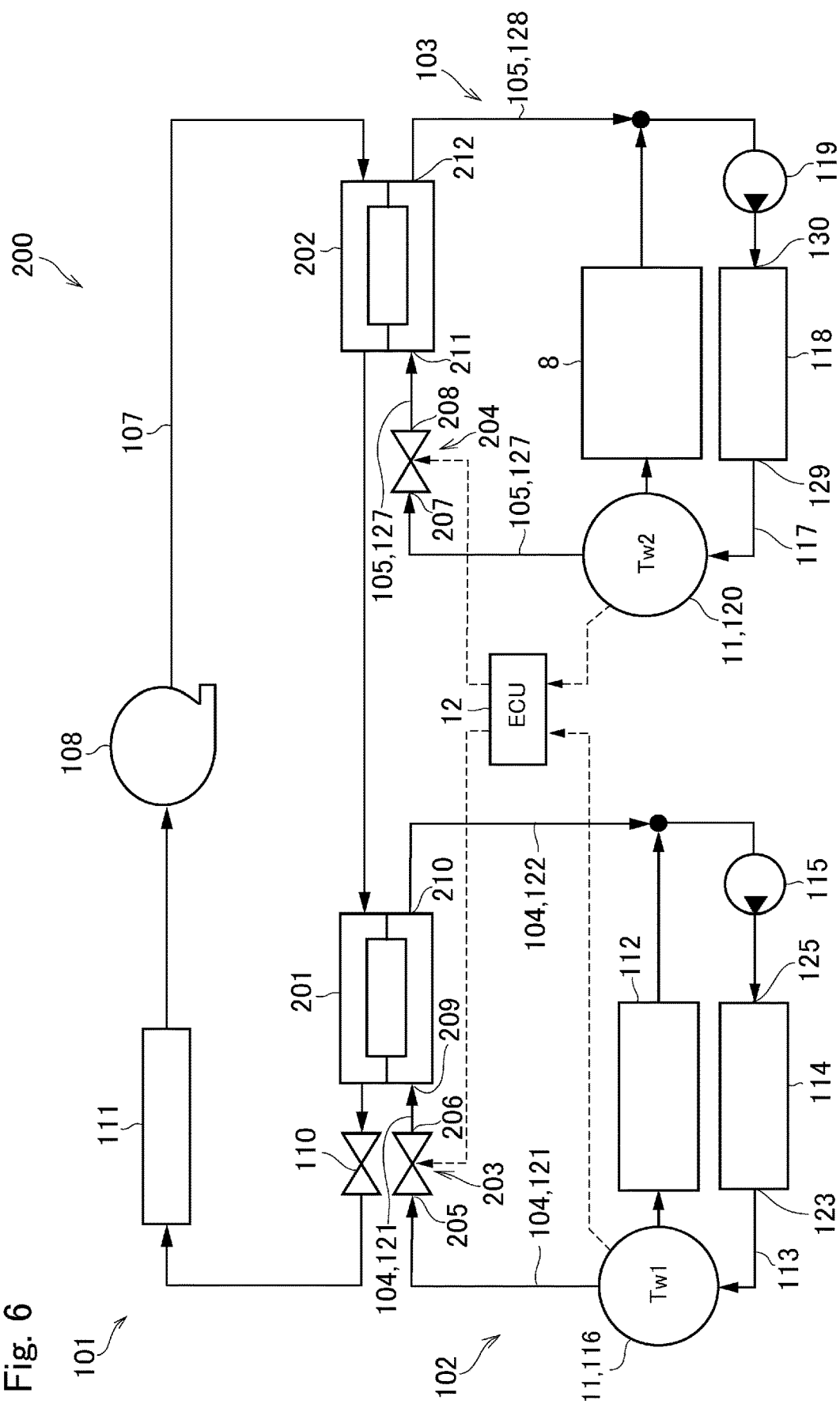
FIG. 6 is a schematic diagram showing a second example of the cooling system according to the exemplary embodiment of the present disclosure.

Turing to FIG. 6, there is shown a cooling system 200 according to the second example. The cooling system 200 shown in FIG. 6 comprises a first condenser 201, a second condenser 202, a first control valve 203, and a second control valve 204.

As the aforementioned condenser 109, each of the first condenser 201 and the second condenser 202 is also a water-cooled condenser that cools the cooling medium 107 by exchanging heat between the cooling medium 107 and the high-current device cooling water 113 or the supercharger cooling water 117. In the refrigerant cooling circuit 101, the first condenser 201 and the second condenser 202 are arranged in series between the compressor 108 and the expansion valve 110.

The first control valve 203 comprises an inlet port 205 and an outlet port 206. When the first control valve 203 is opened, the inlet port 205 and the outlet port 206 are communicated with each other. By contrast, when the first control valve 203 is closed, the communication between the inlet port 205 and the outlet port 206 is interrupted.

The second control valve 204 comprises an inlet port 207 and an outlet port 208. When the second control valve 204 is opened, the inlet port 207 and the outlet port 208 are communicated with each other. By contrast, when the second control valve 204 is closed, the communication between the inlet port 207 and the outlet port 208 is interrupted.

The inlet port 205 of the first control valve 203 is connected to the outlet 123 of the radiator 114 in the high-current device cooling circuit 102 through the feeding passage 121 of the first water passage 104. The outlet port 206 of the first control valve 203 is connected to an inlet 209 of the first condenser 201 in the refrigerant cooling circuit 101 through the feeding passage 121 of the first water passage 104. An outlet 210 of the first condenser 201 is connected to the inlet 125 of the radiator 114 through the returning passage 122 of the first water passage 104 on which the water pump 115 is disposed.

The inlet port 207 of the second control valve 204 is connected to the outlet 129 of the radiator 118 in the supercharger cooling circuit 103 through the feeding passage 127 of the second water passage 105. The outlet port 208 of the second control valve 204 is connected to an inlet 211 of the second condenser 202 in the refrigerant cooling circuit 101 through the feeding passage 127 of the second water passage 105. An outlet 212 of the second condenser 202 is connected to the inlet 130 of the radiator 118 through the water pump 119 through the returning passage 128 of the second water passage 105 on which the water pump 119 is disposed.

The first control valve 203 and the second control valve 204 are also manipulated by the controller 12.

In the cooling system 200, the high-current device cooling water 113 may be supplied selectively to the first condenser 201 through the first water passage 104, and the supercharger cooling water 117 may be supplied selectively to the second condenser 202 through the second water passage 105, by manipulating the first control valve 203 and the second control valve 204 by the controller 12.

The above-explained routine shown in FIG. 5 may also be executed to effectively cool the cooling medium 107 in the cooling system 200 by cooperatively manipulating the first control valve 203 and the second control valve 204. In addition, in the cooling system 200, the first condenser 201 and the second condenser 202 may be used simultaneously by manipulating the first control valve 203 and the second control valve 204 independently. For example, when a temperature difference between the high-current device cooling water 113 and the supercharger cooling water 117 is small, the cooling medium 107 may be cooled effectively by both of the first condenser 201 and the second condenser 202 by opening both of the first control valve 203 and the second control valve 204.

Figure 7:
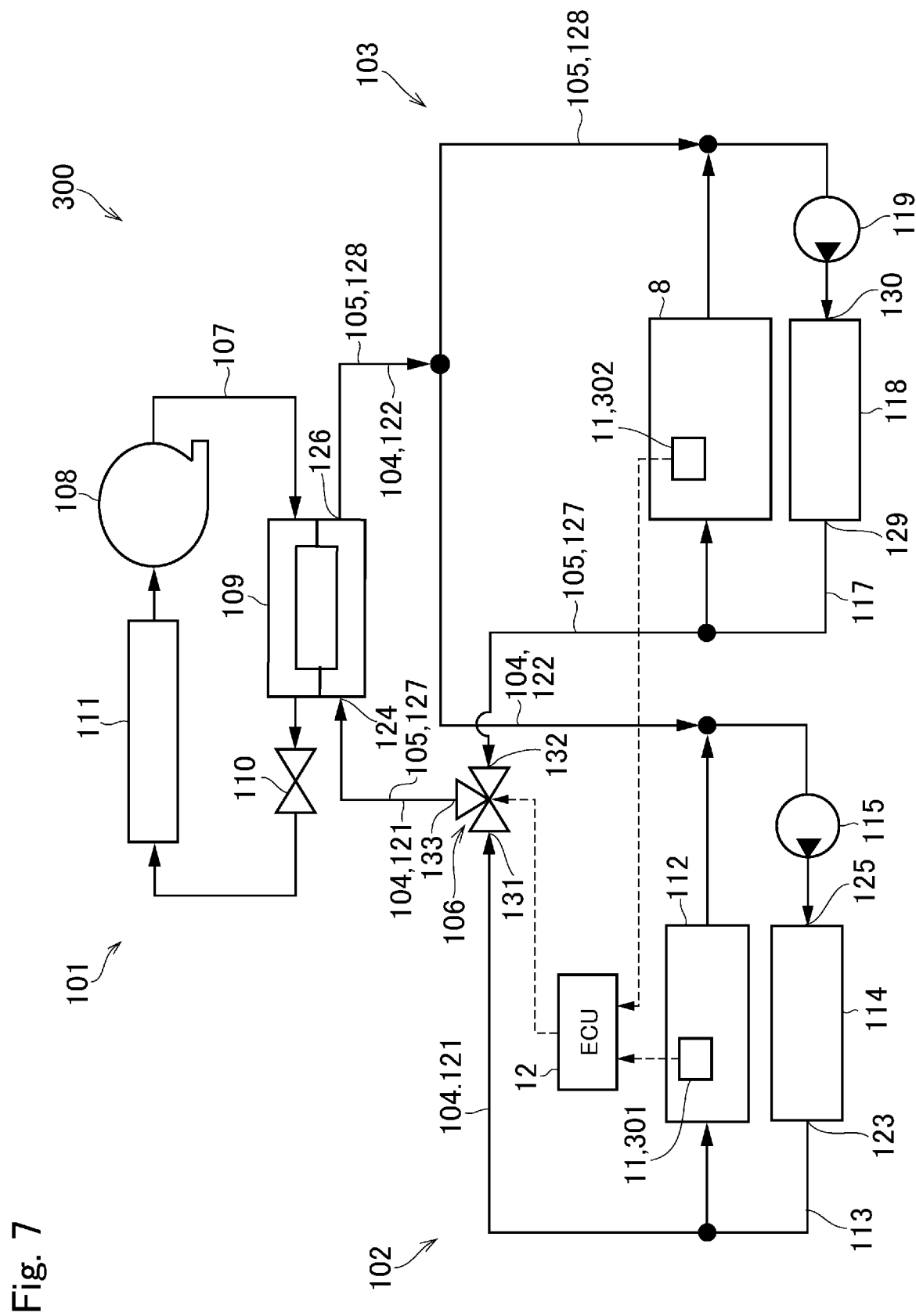
FIG. 7 is a schematic diagram showing a third example of the cooling system according to the exemplary embodiment of the present disclosure.

Turing to FIG. 7, there is shown a cooling system 300 according to the third example. According to the third example, the detector 11 further includes the motor speed sensor 301, and the turbine speed sensor 302. The remaining elements of the cooling system 300 shown in FIG. 7 are similar to those of the cooling system 100 shown in FIG. 2.

The motor speed sensor 301 detects a speed of an output shaft or a rotor shaft (neither of which are shown) of the motor 2 so as to collect data relating to an operating condition of the high-current device 112 including the motor 2.

The turbine speed sensor 302 detects a speed of a turbine of the supercharger 7 so as to collect data relating to operating conditions of the engine 1 and the supercharger 7.

That is, in the cooling system 300 shown in FIG. 7, the motor speed sensor 301 and the turbine speed sensor 302 are arranged instead of the water temperature sensors 116 and 120 of the cooling system 100 shown in FIG. 2. In the cooling system 300 shown in FIG. 7, the controller 12 determines operating conditions of the high-current device 112 including the motor 2, the engine 1, and the supercharger 7 based on the data transmitted from the motor speed sensor 301 and the turbine speed sensor 302. Then, the controller 12 estimates operating conditions of the high-current device cooling circuit 102 and the supercharger cooling circuit 103, based on the operating conditions of the high-current device 112, the engine 1, and the supercharger 7. Thereafter, the controller 12 estimates the first amount of the heat to be transferred from the cooling medium 107 to the high-current device cooling water 113 in the condenser 109, and the second amount of the heat to be transferred from the cooling medium 107 to the supercharger cooling water 117 in the condenser 109, based on the operating conditions of the high-current device cooling circuit 102 and the supercharger cooling circuit 103.

In the cooling system 300 shown in FIG. 7, the control valve 106 is controlled based on the data collected by the detector 11, in such a manner as to select the cooling water to which greater amount of the heat can be transferred from the cooling medium 107, from the high-current device cooling water 113 and the supercharger cooling water 117. In other words, the control valve 106 is controlled in such a manner as to select the water passage to deliver the cooling water to the condenser 109 from the first water passage 104 and the second water passage 105 depending on the running condition of the vehicle Ve.

Figure 8:
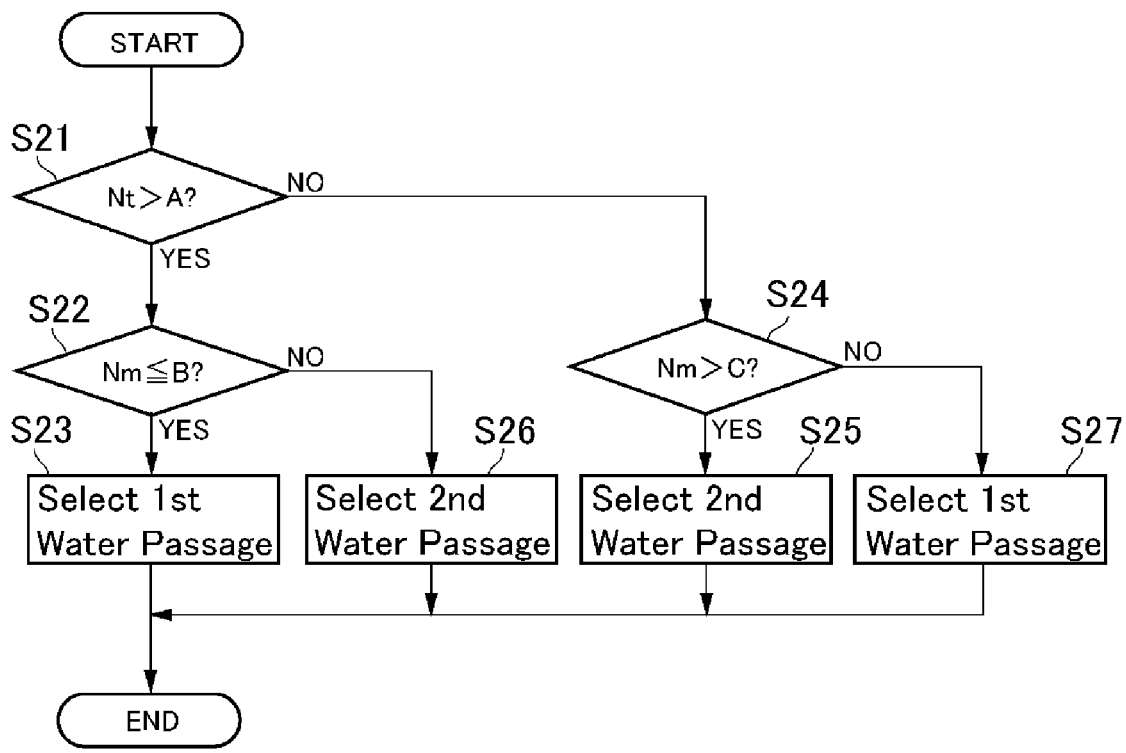
FIG. 8 is a flowchart showing an example of a routine to select the water passage based on the speeds of the motor and the turbine.

In order to manipulate the control valve 106 in the cooling system 300, a routine shown in FIG. 8 is executed by the controller 12. At step S21, a turbine speed Nt detected by the turbine speed sensor 302 is compared to a first reference speed A. Specifically, at step S21, the controller 12 determines whether the turbine speed Nt is higher than the first reference speed A. Specifically, the first reference speed A is a threshold value to determine a fact that the supercharger 7 is activated. For example, the first reference speed A is set to zero or substantially zero, based on a result of experimentation or simulation.

If the turbine speed Nt is higher than the first reference speed A so that the answer of step S21 is YES, the routine progresses to step S22.

At step S22, a motor speed Nm detected by the motor speed sensor 301 is compared to a second reference speed B. In other words, it is determined whether the motor speed Nm is equal to or lower than the second reference speed B. Specifically, the second reference speed B is a threshold value to determine a fact that the motor 2 is activated. For example, the second reference speed B is set to a predetermined low speed based on a result of experimentation or simulation.

If the motor speed Nm is equal to or lower than the second reference speed B so that the answer of step S22 is YES, the routine progresses to step S23 to select the first water passage 104.

At step S23, specifically, the control valve 106 is manipulated in such a manner as to communicate the first port 131 with the third port 133. As a result, the high-current device cooling water 113 in the high-current device cooling circuit 102 is allowed to flow toward the condenser 109 of the refrigerant cooling circuit 101 through the first water passage 104.

In the case that the turbine speed Nt is higher than the first reference speed A and that the motor speed Nm is equal to or lower than the second reference speed B, this means that the supercharger 7 is activated but the motor 2 is not activated. That is, the vehicle Ve is propelled by the output power of the engine 1 boosted by the supercharger 7. In this case, therefore, the temperature of the supercharger cooling water 117 is raised significantly, but the temperature of the high-current device cooling water 113 is not expected to be raised significantly. Based on this assumption, it can be estimated that the temperature of the high-current device cooling water 113 is lower than the temperature of the supercharger cooling water 117. That is, it can be estimated that the first amount of the heat to be transferred from the cooling medium 107 to the high-current device cooling water 113 is greater than the second amount of the heat to be transferred from the cooling medium 107 to the supercharger cooling water 117. At step S23, therefore, the high-current device cooling water 113 whose temperature is lower than the temperature of the supercharger cooling water 117 is delivered to the condenser 109 through the first water passage 104. Consequently, an amount of the heat possible to be drawn from the cooling medium 107 by the heat exchange in the condenser 109 can be maximized. For this reason, the cooling medium 107 can be cooled effectively in the refrigerant cooling circuit 101.

By contrast, if the turbine speed Nt is equal to or lower than the first reference speed A so that the answer of step S21 is NO, the routine progresses to step S26.

At step S24, the motor speed Nm is compared to a third reference speed C. In other words, it is determined whether the motor speed Nm is higher than the third reference speed C. Specifically, the third reference speed C is also a threshold value to determine a fact that the motor 2 is activated. The third reference speed C may also be set to a predetermined low speed based on a result of experimentation or simulation. The third reference speed C may be set not only to a same value as the second reference speed B but also to a different value from the second reference speed B.

If the motor speed Nm is higher than the third reference speed C so that the answer of step S24 is YES, the routine progresses to step S25 to select the second water passage 105.

At step S25, specifically, the control valve 106 is manipulated in such a manner as to communicate the second port 132 with the third port 133. As a result, the supercharger cooling water 117 in the supercharger cooling circuit 103 is allowed to flow toward the condenser 109 of the refrigerant cooling circuit 101 through the second water passage 105.

In the case that the turbine speed Nt is equal to or lower than the first reference speed A and that the motor speed Nm is higher than the third reference speed C, this means that the motor 2 is activated but the supercharger 7 is not activated. That is, the vehicle Ve is propelled by a predetermined small power generated by the engine 1 without activating the supercharger 7, or only by the output power of the motor 2. In this case, therefore, the temperature of the high-current device cooling water 113 is raised significantly, but the temperature of the supercharger cooling water 117 is not expected to be raised significantly. Based on this assumption, it can be estimated that the temperature of the supercharger cooling water 117 is lower than the temperature of the high-current device cooling water 113. That is, it can be estimated that the second amount of the heat to be transferred from the cooling medium 107 to the supercharger cooling water 117 is greater than the first amount of the heat to be transferred from the cooling medium 107 to the high-current device cooling water 113. At step S25, therefore, the supercharger cooling water 117 whose temperature is lower than the temperature of the high-current device cooling water 113 is delivered to the condenser 109 through the second water passage 105. Consequently, an amount of the heat possible to be drawn from the cooling medium 107 by the heat exchange in the condenser 109 can be maximized. For this reason, the cooling medium 107 can be cooled effectively in the refrigerant cooling circuit 101.

After selecting the water passage from the first water passage 104 and the second water passage 105 at step S23 or S25, the routine returns.

If the motor speed Nm is higher than the second reference speed B so that the answer of step S22 is NO, the routine progresses to step S26 to select the second water passage 105 by manipulating the control valve 106 in such a manner as to communicate the second port 132 with the third port 133.

In the case that the turbine speed Nt is higher than the first reference speed A and that the motor speed Nm is higher than the second reference speed B, this means that not only the supercharger 7 but also the motor 2 are activated. That is, the vehicle Ve is propelled by a high power generated by both of the motor 2 and the engine 1 while activating the supercharger 7. In this case, therefore, the temperatures of both the high-current device cooling water 113 and the supercharger cooling water 117 are expected to be raised significantly. That is, a temperature difference between the high-current device cooling water 113 and the supercharger cooling water 117 may not be estimated. At step S26, therefore, the supercharger cooling water 117 is delivered to the condenser 109 through the second water passage 105 so as to protect the high-current device 112 preferentially. Consequently, temperature rise of the high-current device cooling water 113 can be suppressed. Thereafter, the routine returns.

For example, given that the cooling system 300 is provided with the aforementioned temperature sensors 116 and 120, or another means to estimate the temperatures of the cooling waters 113 and 117, the routine may also progress from step S26 to another routine to further control the control valve 106 based on the temperatures of the estimated temperatures of the cooling waters 113 and 117.

If the motor speed Nm is equal to or lower than the third reference speed C so that the answer of step S24 is NO, the routine progresses to step S27 to select the first water passage 104 by manipulating the control valve 106 in such a manner as to communicate the first port 131 with the third port 133.

In the case that the turbine speed Nt is equal to or lower than the first reference speed A and that the motor speed Nm is equal to or lower than the third reference speed C, this means that neither the motor 2 nor the supercharger 7 are activated. That is, the vehicle Ve is powered only by the engine 1 without activating the supercharger 7. In this case, therefore, the temperatures of both the high-current device cooling water 113 and the supercharger cooling water 117 are not expected to be raised significantly. That is, a temperature difference between the high-current device cooling water 113 and the supercharger cooling water 117 may not be estimated. In addition, the water pump 119 in the supercharger cooling circuit 103 may be stopped in this situation to reduce energy consumption. At step S27, therefore, the high-current device cooling water 113 is delivered to the condenser 109 through the first water passage 104 so as to allow the water pump 119 to be stopped. In this case, operation of the supercharger cooling circuit 103 may be stopped to further reduce the energy consumption. Thereafter, the routine returns.

As described, given that the cooling system 300 is provided with the aforementioned temperature sensors 116 and 120, or another means to estimate the temperatures of the cooling waters 113 and 117, the routine may also progress from step S27 to another routine to further control the control valve 106 based on the temperatures of the estimated temperatures of the cooling waters 113 and 117.

Thus, in the cooling system 300, the cooling medium 107 can be cooled in the refrigerant cooling circuit 101 in the most efficient manner. For example, in the case that the turbine speed Nt is higher than the first reference speed A and that the motor speed Nm is lower than the second reference speed B, the first amount of the heat to be transferred from the cooling medium 107 to the high-current device cooling water 113 is estimated to be greater than the second amount of the heat to be transferred from the cooling medium 107 to the supercharger cooling water 117. In this case, the vehicle Ve is propelled mainly by the output power of the engine 1 which is boosted by the supercharger 7, and the temperature of the high-current device cooling water 113 is estimated to be lower than the temperature of the supercharger cooling water 117. In this case, therefore, the first water passage 104 is selected so that the high-current device cooling water 113 whose temperature is lower than the temperature of the supercharger cooling water 117 is delivered to the condenser 109. Consequently, the cooling medium 107 is cooled by the high-current device cooling water 113 in the condenser 109. Otherwise, in the case that the turbine speed Nt is lower than the first reference speed A and that the motor speed Nm is higher than the third reference speed C, the second amount of the heat to be transferred from the cooling medium 107 to the supercharger cooling water 117 is estimated to be greater than the first amount of the heat to be transferred from the cooling medium 107 to the high-current device cooling water 113. In this case, the vehicle Ve is powered mainly by the motor 2, and the temperature of the supercharger cooling water 117 is estimated to be lower than the high-current device cooling water 113. In this case, therefore, the second water passage 105 is selected so that the supercharger cooling water 117 whose temperature is lower than the temperature of the high-current device cooling water 113 is delivered to the condenser 109. Consequently, the cooling medium 107 is cooled by the supercharger cooling water 117 in the condenser 109.

Thus, even if e.g., the engine 1 is highly loaded and a supercharging pressure is high, the cooling medium 107 can be cooled effectively by the high-current device cooling water 113 without restricting the supercharging pressure. By contrast, even if e.g., the motor 2 is highly loaded, the cooling medium 107 can be cooled effectively by the supercharger cooling water 117 without restricting the output power of the motor 2. In other words, the cooling medium 107 can be cooled efficiently irrespective of the running condition of the vehicle Ve, and without reducing the driving performance of the vehicle Ve.

Here will be explained still another examples of the cooling system according to the embodiment of the present disclosure. In the following examples, common reference numerals are allotted to the foregoing elements.

Figure 9:
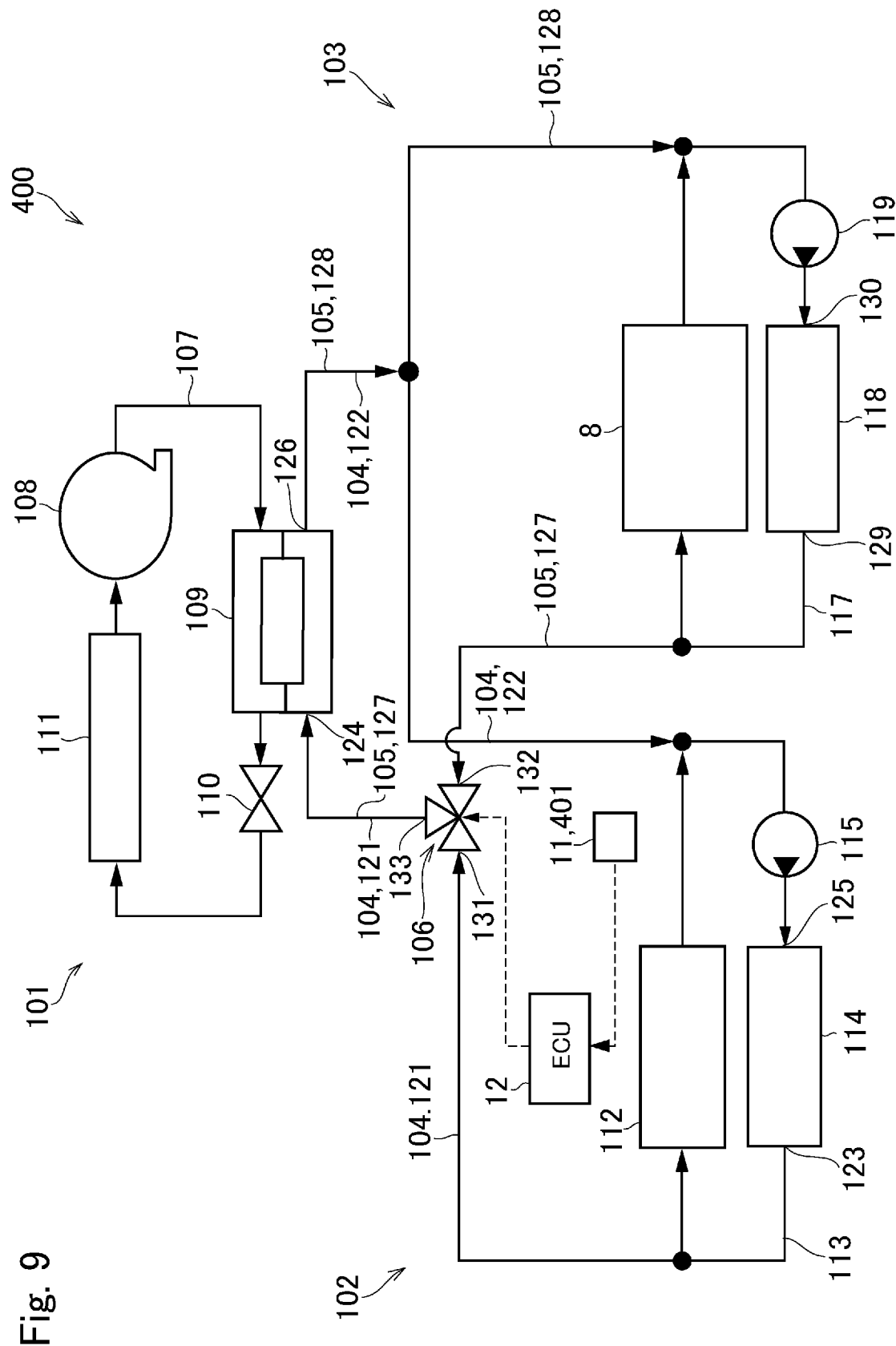
FIG. 9 is a schematic diagram showing a fourth example of the cooling system according to the exemplary embodiment of the present disclosure.

Turing to FIG. 9, there is shown a cooling system 400 according to the fourth example. According to the fourth example, the detector 11 further includes the vehicle speed sensor 401. The remaining elements of the cooling system 400 shown in FIG. 9 are similar to those of the cooling system 100 shown in FIG. 2.

The vehicle speed sensor 401 detects a speed of the vehicle Ve so as to collect data relating to the operating condition of the vehicle Ve. Instead, the vehicle speed may also be detected by a detection value of a wheel speed sensor (not shown) arranged in each wheel of the vehicle Ve, or an acceleration sensor (not shown) that detects a longitudinal acceleration of the vehicle Ve.

In the cooling system 400 shown in FIG. 9, the control valve 106 is controlled based on the vehicle speed in such a manner as to select the cooling water to which greater amount of the heat can be transferred from the cooling medium 107, from the high-current device cooling water 113 and the supercharger cooling water 117. In other words, the control valve 106 is controlled in such a manner as to select the water passage to deliver the cooling water to the condenser 109 from the first water passage 104 and the second water passage 105 depending on the vehicle speed. For example, if the speed the vehicle Ve detected by the vehicle speed sensor 401 is lower than a predetermined reference speed set to an extremely low speed, the controller 12 determines that the vehicle Ve is stopped. In this case, the second amount of the heat to be transferred from the cooling medium 107 to the supercharger cooling water 117 is estimated to be greater than the first amount of the heat to be transferred from the cooling medium 107 to the high-current device cooling water 113. When the vehicle Ve stops, the engine 1 is not subjected to a load and the supercharger 7 is not activated. In this case, therefore, the temperature of the supercharger cooling water 117 is not expected to be raised. In addition, when the vehicle is decelerated before stopping, and when the vehicle Ve is launched, the vehicle Ve is powered mainly by the motor 2, therefore, the temperature of the high-current device cooling water 113 is expected to be raised. In this case, therefore, the second water passage 105 is selected so that the supercharger cooling water 117 whose temperature is lower than the temperature of the high-current device cooling water 113 is delivered to the condenser 109. Consequently, the cooling medium 107 is cooled by the supercharger cooling water 117 in the condenser 109. In the cooling system 400, therefore, the cooling medium 107 can be cooled efficiently even when the vehicle Ve stops.

Figure 10:
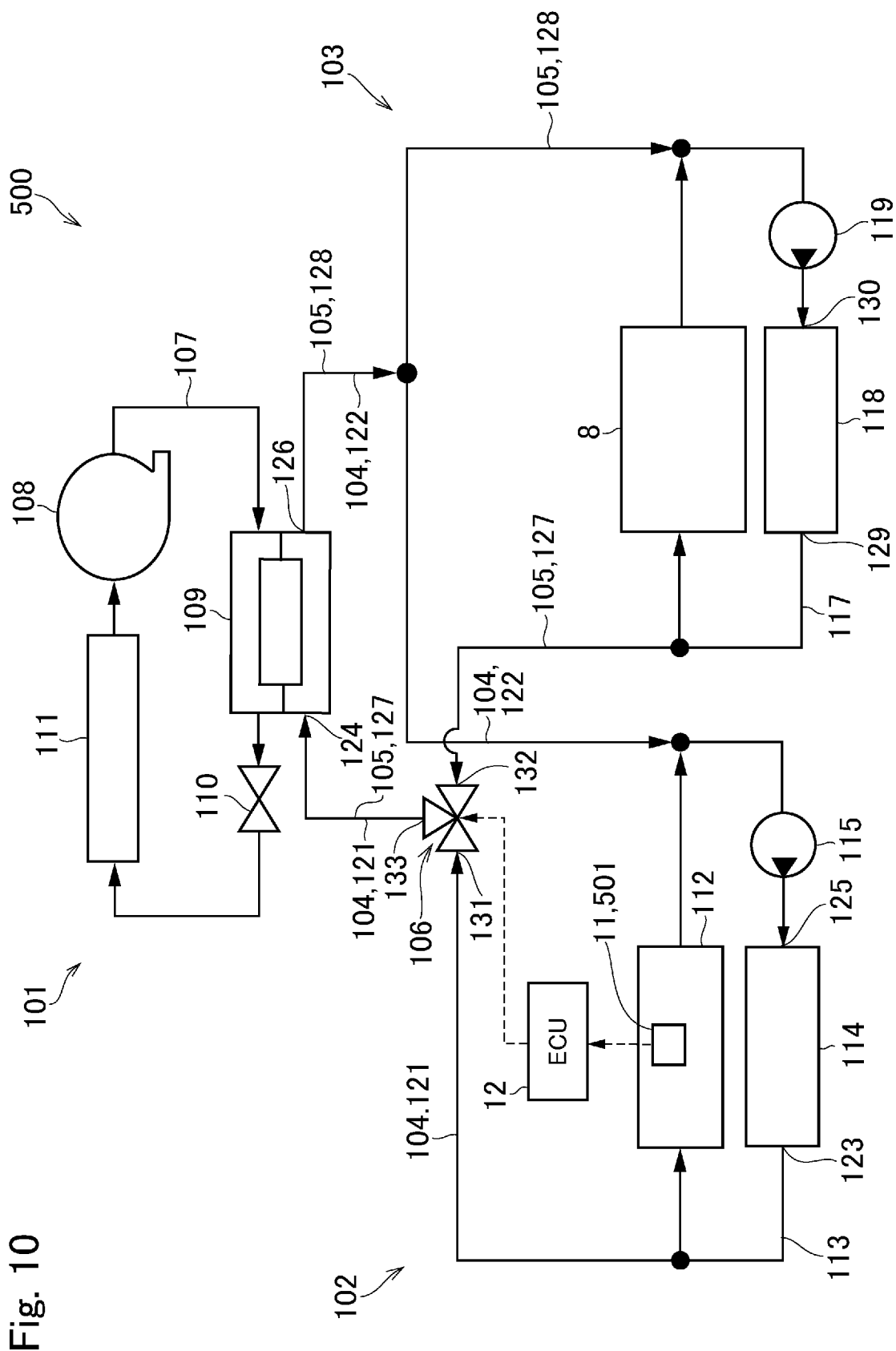
FIG. 10 is a schematic diagram showing a fifth example of the cooling system according to the exemplary embodiment of the present disclosure.

Turing to FIG. 10, there is shown a cooling system 500 according to the fifth example. According to the fifth example, the detector 11 further includes the SOC level sensor 501. The remaining elements of the cooling system 500 shown in FIG. 10 are similar to those of the cooling system 100 shown in FIG. 2.

The SOC level sensor 501 detects an SOC level of the battery 9 so as to collect data relating to the operating condition of the high-current device 112.

In the cooling system 500 shown in FIG. 10, the control valve 106 is controlled based on the SOC level of the battery 9 in such a manner as to select the cooling water to which greater amount of the heat can be transferred from the cooling medium 107, from the high-current device cooling water 113 and the supercharger cooling water 117. In other words, the control valve 106 is controlled in such a manner as to select the water passage to deliver the cooling water to the condenser 109 from the first water passage 104 and the second water passage 105 depending on the SOC level of the battery 9. For example, if the SOC level of the battery 9 detected by the SOC level sensor 501 is lower than a predetermined reference level, the first amount of the heat to be transferred from the cooling medium 107 to the high-current device cooling water 113 is estimated to be greater than the second amount of the heat to be transferred from the cooling medium 107 to the supercharger cooling water 117. Basically, when the SOC level of the battery 9 is low, the motor 2 is operated as a generator to charge the battery 9. When the motor 2 is operated as a generator, the temperature of the motor 2 is not be raised significantly compared to a case of operating the motor 2 as a prime mover, and hence the temperature of the high-current device cooling water 113 will not be raised significantly. Accordingly, the temperature of the high-current device cooling water 113 is estimated to be lower than the temperature of the supercharger cooling water 117. In this case, therefore, the first water passage 104 is selected so that the high-current device cooling water 113 whose temperature is lower than the temperature of the supercharger cooling water 117 is delivered to the condenser 109. Consequently, the cooling medium 107 is cooled by the high-current device cooling water 113 in the condenser 109. In the cooling system 500, therefore, the cooling medium 107 can be cooled efficiently even when the SOC level of the battery 9 is low.

Figure 11:
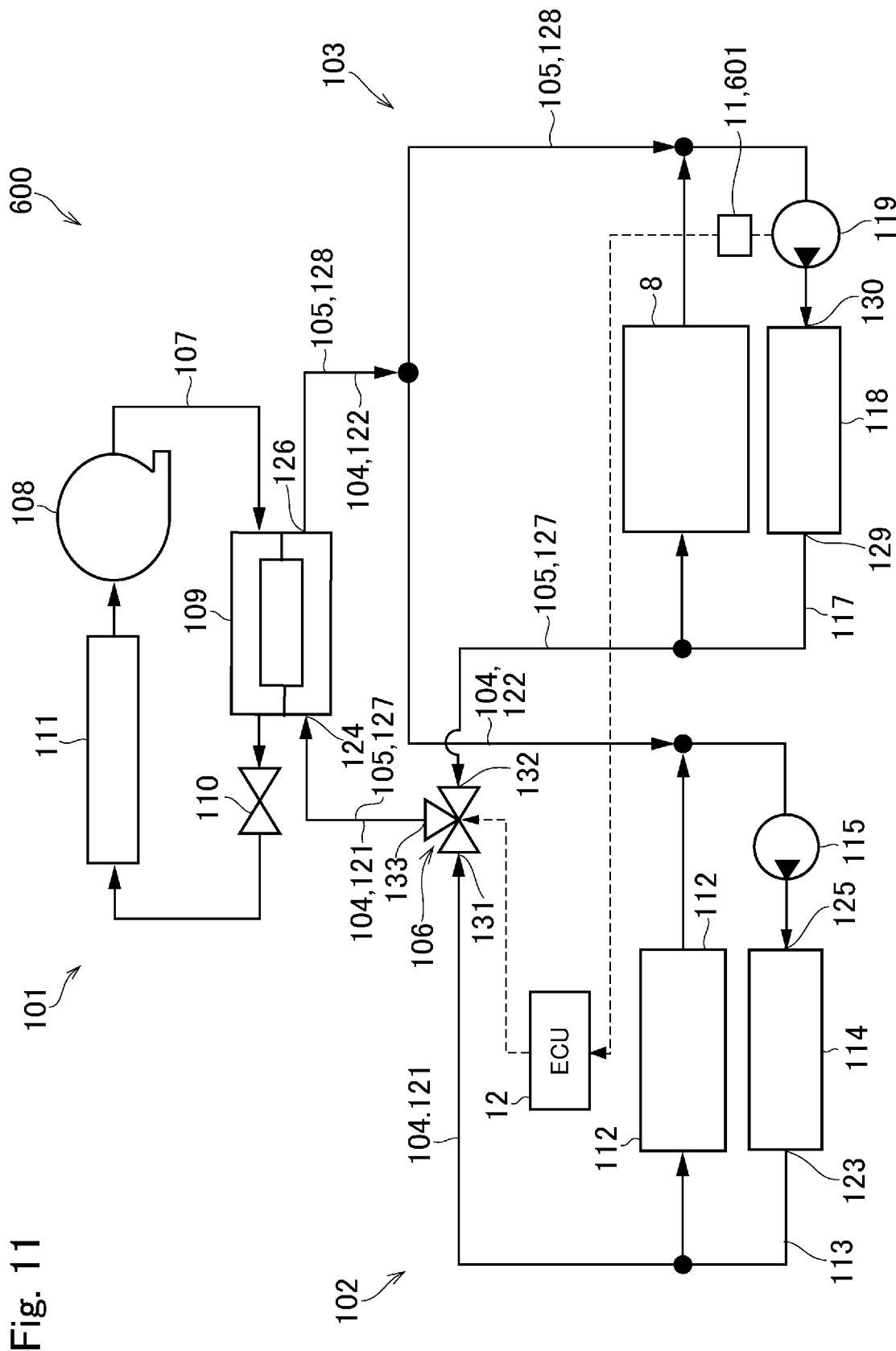
FIG. 11 is a schematic diagram showing a sixth example of the cooling system according to the exemplary embodiment of the present disclosure.

Turing to FIG. 11, there is shown a cooling system 600 according to the sixth example. According to the sixth example, the detector 11 further includes the pump sensor 601. The remaining elements of the cooling system 500 shown in FIG. 10 are similar to those of the cooling system 100 shown in FIG. 2.

The pump sensor 601 detects an operating condition of the water pump 119 so as to collect data relating to the operating condition of the supercharger cooling circuit 103.

For example, the pump sensor 601 detects a rotational speed of a driveshaft (not shown) of the water pump 119, or an energization of an electric motor (not shown) to drive the water pump 119.

In the cooling system 600 shown in FIG. 11, the control valve 106 is controlled based on the operating condition of the supercharger cooling circuit 103 in such a manner as to select the cooling water to which greater amount of the heat can be transferred from the cooling medium 107, from the high-current device cooling water 113 and the supercharger cooling water 117. In other words, the control valve 106 is controlled in such a manner as to select the water passage to deliver the cooling water to the condenser 109 from the first water passage 104 and the second water passage 105 depending on the operating condition of the supercharger cooling circuit 103. For example, if the operating load of the engine 1 is low and the supercharger 7 is not activated, it is not necessary to cool the intake air. In this case, therefore, an operation of the water pump 119 in the supercharger cooling circuit 103 may be stopped to reduce energy consumption. When the water pump 119 is stopped, the first amount of the heat to be transferred from the cooling medium 107 to the high-current device cooling water 113 is estimated to be greater than the second amount of the heat to be transferred from the cooling medium 107 to the supercharger cooling water 117. That is, in this situation, the supercharger cooling water 117 is not delivered to the condenser 109 from the supercharger cooling circuit 103, and hence the second amount of the heat is estimated as zero. In this case, therefore, the first water passage 104 is selected so that the high-current device cooling water 113 whose temperature is lower than the temperature of the supercharger cooling water 117 is delivered to the condenser 109. Consequently, the cooling medium 107 is cooled by the high-current device cooling water 113 in the condenser 109. In the cooling system 600, therefore, the cooling medium 107 can be cooled efficiently even when the operation of the supercharger cooling circuit 103 is stopped.

Although the above exemplary embodiments of the present disclosure have been described, it will be understood by those skilled in the art that the present disclosure should not be limited to the described exemplary embodiments, and various changes and modifications can be made within the scope of the present disclosure.

What is claimed is:

1. A cooling system for a hybrid vehicle, the cooling system comprising:
  a prime mover including an engine having a supercharger, and a motor;
  an air conditioner that cools a vehicle interior;
  a refrigerant cooling circuit that cools a cooling medium used in the air conditioner;
  a high-current device cooling circuit that cools a high-current device cooling water delivered to a high-current device that controls the motor;
  a water-cooled intercooler that cools an air compressed by the supercharger; and
  a supercharger cooling circuit that cools a supercharger cooling water delivered to the water-cooled intercooler,
  wherein the refrigerant cooling circuit includes a water-cooled condenser that exchanges heat between the cooling medium and the high-current device cooling water or the supercharger cooling water thereby cooling the cooling medium,
  the cooling system comprising:
  a first water passage that connects the refrigerant cooling circuit to the high-current device cooling circuit to deliver the high-current device cooling water to the water-cooled condenser;
  a second water passage that connects the refrigerant cooling circuit to the supercharger cooling circuit to deliver the supercharger cooling water to the water-cooled condenser;
  a control valve that selectively communicates the high-current device cooling circuit with the refrigerant cooling circuit through the first water passage, and selectively communicates the supercharger cooling circuit with the refrigerant cooling circuit through the second water passage;
  a detector that detects data relating to an operating condition of at least one of the high-current device cooling circuit, the supercharger cooling circuit, the high-current device, the engine, the supercharger, and the hybrid vehicle, the detector including a motor speed sensor that detects a rotational speed of the motor, and a turbine speed sensor that detects a rotational speed of a turbine of the supercharger; and
  a controller that is configured to:
  select one of the first water passage and the second water passage by manipulating the control valve based on the data collected by the detector, in such a manner as to maximize an amount of heat transferred from the cooling medium to the high-current device cooling water or the supercharger cooling water, the selection of the one of the first water passage and the second water passage including:
    selecting the first water passage to deliver the high-current device cooling water to the water-cooled condenser if the rotational speed of the turbine is higher than a first reference speed and the rotational speed of the motor is equal to or lower than a second reference speed, and
    selecting the second water passage to deliver the supercharger cooling water to the water-cooled condenser if the rotational speed of the turbine is equal to or lower than the first reference speed and the rotational speed of the motor is higher than a third reference speed.

2. A cooling system for a hybrid vehicle, the cooling system comprising:
  a prime mover including an engine having a supercharger, and a motor;
  an air conditioner that cools a vehicle interior;
  a refrigerant cooling circuit that cools a cooling medium used in the air conditioner;
  a high-current device cooling circuit that cools a high-current device cooling water delivered to a high-current device that controls the motor;
  a water-cooled intercooler that cools an air compressed by the supercharger; and
  a supercharger cooling circuit that cools a supercharger cooling water delivered to the water-cooled intercooler,
  wherein the refrigerant cooling circuit includes a water-cooled condenser that exchanges heat between the cooling medium and the high-current device cooling water or the supercharger cooling water thereby cooling the cooling medium,
  the cooling system comprising:
  a first water passage that connects the refrigerant cooling circuit to the high-current device cooling circuit to deliver the high-current device cooling water to the water-cooled condenser;

a second water passage that connects the refrigerant cooling circuit to the supercharger cooling circuit to deliver the supercharger cooling water to the water-cooled condenser;

a control valve that selectively communicates the high-current device cooling circuit with the refrigerant cooling circuit through the first water passage, and selectively communicates the supercharger cooling circuit with the refrigerant cooling circuit through the second water passage;

a detector that detects data relating to an operating condition of at least one of the high-current device cooling circuit, the supercharger cooling circuit, the high-current device, the engine, the supercharger, and the hybrid vehicle; and a controller that is configured to select one of the first water passage and the second water passage by manipulating the control valve based on the data collected by the detector, in such a manner as to maximize an amount of heat transferred from the cooling medium to the high-current device cooling water or the supercharger cooling water, wherein the supercharger cooling circuit includes a water pump that circulates the supercharger cooling water in the supercharger cooling circuit, the detector includes a pump sensor that detects an operating condition of the water pump, and the controller is further configured to select the first water passage to deliver the high-current device cooling water to the water-cooled condenser if the water pump stops.

3. A cooling system for a hybrid vehicle, the cooling system comprising:

a prime mover including an engine having a supercharger, and a motor;

an air conditioner that cools a vehicle interior;

a refrigerant cooling circuit that cools a cooling medium used in the air conditioner;

a high-current device cooling circuit that cools a high-current device cooling water delivered to a high-current device that controls the motor;

a water-cooled intercooler that cools an air compressed by the supercharger; and a supercharger cooling circuit that cools a supercharger cooling water delivered to the water-cooled intercooler, wherein the refrigerant cooling circuit includes a water-cooled condenser that exchanges heat between the cooling medium and the high-current device cooling water or the supercharger cooling water thereby cooling the cooling medium, the cooling system comprising:

a first water passage that connects the refrigerant cooling circuit to the high-current device cooling circuit to deliver the high-current device cooling water to the water-cooled condenser;

a second water passage that connects the refrigerant cooling circuit to the supercharger cooling circuit to deliver the supercharger cooling water to the water-cooled condenser;

a control valve that selectively communicates the high-current device cooling circuit with the refrigerant cooling circuit through the first water passage, and selectively communicates the supercharger cooling circuit with the refrigerant cooling circuit through the second water passage;

a detector that detects data relating to an operating condition of at least one of the high-current device cooling circuit, the supercharger cooling circuit, the high-current device, the engine, the supercharger, and the hybrid vehicle, the detector including a motor speed sensor that detects a rotational speed of the motor, and a turbine speed sensor that detects a rotational speed of a turbine of the supercharger; and a controller that is configured to:

select one of the first water passage and the second water passage by manipulating the control valve based on the data collected by the detector, in such a manner as to maximize an amount of heat transferred from the cooling medium to the high-current device cooling water or the supercharger cooling water, the selection of the one of the first water passage and the second water passage including:

selecting the first water passage to deliver the high-current device cooling water to the water-cooled condenser if the rotational speed of the turbine is higher than a first reference speed and the rotational speed of the motor is equal to or lower than a second reference speed, selecting the second water passage to deliver the supercharger cooling water to the water-cooled condenser if the rotational speed of the turbine is equal to or lower than the first reference speed and the rotational speed of the motor is higher than a third reference speed, selecting the first water passage to deliver the high-current device cooling water to the water-cooled condenser if the rotational speed of the turbine is higher than a first reference speed and the rotational speed of the motor is equal to or lower than a second reference speed, and selecting the second water passage to deliver the supercharger cooling water to the water-cooled condenser if the rotational speed of the turbine is equal to or lower than the first reference speed and the rotational speed of the motor is higher than a third reference speed.

* * * * *